United States Patent
Kugler et al.

(10) Patent No.: US 10,514,797 B2
(45) Date of Patent: Dec. 24, 2019

(54) FORCE-SENSITIVE USER INPUT INTERFACE FOR AN ELECTRONIC DEVICE

(71) Applicant: Google LLC, Mountain View, CA (US)

(72) Inventors: Tyler Reed Kugler, San Francisco, CA (US); Stuart Murray Scott, San Francisco, CA (US); Alexey Polyudov, Morgan Hill, CA (US); Seungyon Lee, Sunnyvale, CA (US); Philip Quinn, San Jose, CA (US); Kishore Sundara-Rajan, Redwood City, CA (US); Shumin Zhai, Los Altos, CA (US); Debanjan Mukherjee, San Jose, CA (US); James B. Miller, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 9 days.

(21) Appl. No.: 15/490,760

(22) Filed: Apr. 18, 2017

(65) Prior Publication Data

US 2018/0300004 A1    Oct. 18, 2018

(51) Int. Cl.
*G06F 3/041* (2006.01)
*G06F 1/16* (2006.01)
*G06F 3/0354* (2013.01)

(52) U.S. Cl.
CPC ............ *G06F 3/0414* (2013.01); *G06F 1/169* (2013.01); *G06F 3/03547* (2013.01);
(Continued)

(58) Field of Classification Search
CPC combination set(s) only.
See application file for complete search history.

(56) References Cited

U.S. PATENT DOCUMENTS

| 5,648,757 A | 7/1997 | Vernace et al. |
| 5,922,967 A * | 7/1999 | Motoyama ............... G01B 7/18 73/772 |

(Continued)

FOREIGN PATENT DOCUMENTS

| CN | 103502914 | 4/2010 |
| CN | 104049734 | 9/2014 |

(Continued)

OTHER PUBLICATIONS

International Search Report and Written Opinion issued in International Application No. PCT/US2017/057904, dated Jan. 19, 2018, 16 pages.

(Continued)

*Primary Examiner* — Mihir K Rayan
(74) *Attorney, Agent, or Firm* — Fish & Richardson P.C.

(57) ABSTRACT

A method includes one or more processors of an electronic device receiving signals from multiple sensors located along an edge of the device. The signals are received in response to external contact being provided to the edge of the device. At least one processor determines a distribution of forces applied to the sensors based on the input signals. Based on the determined distribution of forces, the processor determines: i) a location of the external contact that is offset from a location of each of the multiple sensors, and ii) a magnitude of the force of the external contact. The processor detects whether sensing criteria has been satisfied based on an analysis of: i) the location of the external contact and ii) the magnitude of the force of the external contact. Responsive to detecting that sensing criteria has been satisfied, the processor executes a user input action.

19 Claims, 13 Drawing Sheets

(52) U.S. Cl.
CPC .... *G06F 3/0416* (2013.01); *G06F 2203/0339* (2013.01); *G06F 2203/04101* (2013.01); *G06F 2203/04105* (2013.01)

(56) References Cited

U.S. PATENT DOCUMENTS

| | | | |
|---|---|---|---|
| 6,392,584 | B1 | 5/2002 | Eklund |
| 6,414,619 | B1 | 7/2002 | Swanson |
| 6,526,801 | B2 | 3/2003 | Kouznestsov |
| 6,747,573 | B1 | 6/2004 | Gerlack |
| 6,823,200 | B2 | 11/2004 | Rekimoto |
| 7,546,772 | B2 | 6/2009 | Cabuz et al. |
| 7,974,500 | B2 | 6/2011 | Silverbrook et al. |
| 8,078,884 | B2 | 12/2011 | Ramatishnan |
| 8,417,303 | B2 | 4/2013 | Ladouceur |
| 8,442,602 | B2 | 5/2013 | Wong |
| 8,536,765 | B2 | 9/2013 | Oh et al. |
| 8,539,765 | B2 | 9/2013 | Oh et al. |
| 8,559,086 | B2 | 10/2013 | Davis et al. |
| 9,304,948 | B2 | 4/2016 | Whitman et al. |
| 9,411,451 | B2 | 8/2016 | Myers et al. |
| 9,460,029 | B2 | 10/2016 | Shaw et al. |
| 9,465,412 | B2 | 10/2016 | Belesiu et al. |
| 2003/0026971 | A1 | 2/2003 | Inkster et al. |
| 2003/0210235 | A1 | 11/2003 | Roberts |
| 2004/0125079 | A1 | 7/2004 | Kaneko et al. |
| 2004/0203500 | A1 | 10/2004 | Wong et al. |
| 2004/0203503 | A1 | 10/2004 | Rollins |
| 2006/0028459 | A1 | 2/2006 | Underwood et al. |
| 2006/0041926 | A1 | 2/2006 | Istvan |
| 2006/0293864 | A1 | 12/2006 | Soss |
| 2008/0053713 | A1 | 3/2008 | Huang et al. |
| 2008/0122796 | A1 | 5/2008 | Jobs |
| 2008/0166966 | A1 | 7/2008 | Hamasak |
| 2009/0259969 | A1 | 10/2009 | Pallakoff |
| 2009/0312051 | A1 | 12/2009 | Hamasak |
| 2009/0315745 | A1 | 12/2009 | McLoughlin |
| 2010/0007618 | A1* | 1/2010 | Park ................ G06F 1/1626 345/173 |
| 2010/0015918 | A1 | 1/2010 | Liu |
| 2010/0085317 | A1* | 4/2010 | Park ................ G06F 1/1626 345/173 |
| 2010/0085724 | A1 | 4/2010 | Park |
| 2010/0113111 | A1 | 5/2010 | Wong |
| 2010/0123686 | A1 | 5/2010 | Klinghult et al. |
| 2010/0201635 | A1 | 8/2010 | Klinghult et al. |
| 2010/0287470 | A1* | 11/2010 | Homma ............. G06F 3/03547 715/702 |
| 2011/0069024 | A1 | 3/2011 | Kim |
| 2011/0080367 | A1 | 4/2011 | Marchand et al. |
| 2011/0187651 | A1* | 8/2011 | Whitlow .............. G06F 3/041 345/173 |
| 2011/0227726 | A1 | 9/2011 | Lee |
| 2012/0032979 | A1 | 2/2012 | Blow |
| 2012/0075194 | A1* | 3/2012 | Ferren ............... G02B 13/0065 345/168 |
| 2012/0088553 | A1* | 4/2012 | Nunes .................. G06F 1/1626 455/566 |
| 2012/0098530 | A1 | 4/2012 | Saito et al. |
| 2013/0002565 | A1 | 1/2013 | Tumanov et al. |
| 2013/0009905 | A1 | 1/2013 | Castillo et al. |
| 2013/0076646 | A1 | 3/2013 | Krah et al. |
| 2013/0096849 | A1* | 4/2013 | Campbell ............. G06F 3/0414 702/42 |
| 2013/0135223 | A1 | 5/2013 | Shai |
| 2013/0154998 | A1 | 6/2013 | Yang et al. |
| 2013/0160567 | A1 | 6/2013 | Ota |
| 2013/0176265 | A1 | 7/2013 | Zurek |
| 2013/0211740 | A1 | 8/2013 | Ramamurthy et al. |
| 2013/0234948 | A1 | 9/2013 | Jian |
| 2013/0283378 | A1 | 10/2013 | Costigan et al. |
| 2013/0300668 | A1 | 11/2013 | Churikov et al. |
| 2014/0000386 | A1 | 1/2014 | Malhan et al. |
| 2014/0008999 | A1 | 1/2014 | Prest et al. |
| 2014/0013254 | A1* | 1/2014 | Hosein ................ G06F 3/04817 715/765 |
| 2014/0042873 | A1 | 2/2014 | Shen |
| 2014/0073378 | A1 | 3/2014 | Coverstone |
| 2014/0200054 | A1 | 7/2014 | Fraden |
| 2014/0217853 | A1 | 8/2014 | Mankowski |
| 2014/0218372 | A1 | 8/2014 | Missig |
| 2014/0289655 | A1 | 9/2014 | Park et al. |
| 2014/0368436 | A1* | 12/2014 | Abzarian .............. G06F 3/0488 345/168 |
| 2014/0375582 | A1* | 12/2014 | Park ...................... G06F 3/0414 345/173 |
| 2015/0069126 | A1 | 3/2015 | Leon |
| 2015/0119114 | A1 | 4/2015 | Smith |
| 2015/0207436 | A1 | 7/2015 | Lee |
| 2015/0257158 | A1 | 9/2015 | Jadhav |
| 2015/0296622 | A1 | 10/2015 | Jiang et al. |
| 2015/0317076 | A1 | 11/2015 | Goel et al. |
| 2015/0331522 | A1 | 11/2015 | McMillen |
| 2016/0084674 | A1 | 3/2016 | Cambou et al. |
| 2016/0191103 | A1 | 6/2016 | Balaji |
| 2016/0216164 | A1* | 7/2016 | Teil ....................... G06F 1/1626 |
| 2017/0031495 | A1 | 2/2017 | Smith |
| 2017/0038905 | A1 | 2/2017 | Bijamov et al. |
| 2017/0336899 | A1* | 11/2017 | Szeto .................... G06F 1/1692 |

FOREIGN PATENT DOCUMENTS

| | | | |
|---|---|---|---|
| EP | 2175344 | | 4/2010 |
| EP | 2175625 | | 4/2010 |
| EP | 2672368 | | 12/2013 |
| EP | 2784521 | | 1/2014 |
| EP | 2784630 | | 10/2014 |
| EP | 2801889 | | 11/2014 |
| GB | 1391830 | | 4/1975 |
| GB | 2522755 | * | 12/2014 ............. G06F 3/041 |
| TW | M533228 U | | 12/2016 |
| TW | M538191 U | | 3/2017 |
| TW | 201723769 | | 7/2017 |
| WO | 2006/035342 | | 4/2006 |
| WO | 2010/058301 | | 5/2010 |
| WO | WO 2015/047616 | | 4/2015 |
| WO | 2015/130040 | | 9/2015 |
| WO | WO 2015/179262 | | 11/2015 |
| WO | WO 2016/027113 | | 2/2016 |
| WO | WO 2016/154762 | | 10/2016 |
| WO | WO 2017/011810 | | 1/2017 |

OTHER PUBLICATIONS

International Search Report and Written Opinion issued in International Application No. PCT/US2017/064916, dated Apr. 30, 2018, 21 pages.
Invitation to Pay Additional Fees and, Where Applicable, Protest Fees issued in International Application No. PCT/US2017/065304, dated Feb. 27, 2018, 26 pages.
Invitation to Pay Additional Fees and, Where Applicable, Protest Fees issued in International Application No. PCT/US2017/064916, dated Mar. 5, 2018, 15 pages.
International Search Report and Written Opinion issued in International Application No. PCT/US2017/065307, dated Mar. 7, 2018, 14 pages.
International Search Report and Written Opinion issued in International Application No. PCT/US2017/047065, dated Nov. 10, 2017, 13 pages.
Written Opinion issued in International Application No. PCT/US2017/047065, dated May 24, 2018, 6 pages.
International Preliminary Report on Patentability issued in International Application No. PCT/US2017/057904, dated Feb. 14, 2019, 19 pages.
International Search Report and Written Opinion issued in International Application No. PCT/US2017/065304, dated Jun. 26, 2018, 28 pages.
Written Opinion issued in International Application No. PCT/US2017/064916, dated Oct. 22, 2018, 8 pages.

(56) References Cited

OTHER PUBLICATIONS

TW Office Action in Taiwanese Appln. 107100053, dated May 8, 2019, 21 pages (with English translation).

* cited by examiner

FORCE-SENSITIVE USER INPUT INTERFACE FOR AN ELECTRONIC DEVICE

BACKGROUND

Electronic devices sometimes include buttons that protrude from an exterior surface of a housing of the electronic device. In general, the buttons serve as physical inputs to allow users to cause changes to device functions (such as volume control, display activation/deactivation, switching to/from vibrate mode, etc.). Such buttons are sometimes positioned on the sides of electronic devices such as smartphones, other mobile cellular devices, tablet computers, notebook computers, and desktop computers.

SUMMARY

An electronic device may include multiple strain gauge sensors to enable receipt of user input. The strain gauge sensors may each be disposed at or adjacent an inner surface of a housing of the device. The strain gauge sensors can interface with other circuit components of the electronic device to cause the device to respond in various manners, based on characteristics of the strain that is detected at an edge of the electronic device. For example, the strain gauge sensors may be configured to sense particular types of user input based on at least one of: a magnitude of applied strain, a relative location of the applied strain, and a duration of the applied strain.

One aspect of the subject matter described in this specification can be embodied in a computer-implemented method. The method includes, receiving, by one or more processors of an electronic device, input signals from multiple sensors located along an edge of the electronic device, the input signals being generated in response to external contact detected by the multiple sensors; determining, by the one or more processors and based on the input signals, a distribution of forces that were detected by the multiple sensors; and determining, by the one or more processors and based on the determined distribution of forces, a location of the external contact, wherein the location of the external contact is offset from a location of each of the multiple sensors. The method also includes, determining, by the one or more processors and based on the determined distribution of forces, a magnitude of a force of the external contact; detecting, by the one or more processors, whether sensing criteria have been satisfied based on an analysis of: i) the determined location of the external contact, and ii) the determined magnitude of the force of the external contact; and executing, by the one or more processors, responsive to detecting that the sensing criteria have been satisfied, a user input action.

These and other implementations can each optionally include one or more of the following features. For example, in some implementations, the electronic device includes a first substrate layer and a second substrate layer that are each disposed between an exterior surface of the electronic device and the multiple sensors, and determining the magnitude of the force of the external contact includes: i) normalizing parameter values of the received input signals based on a first deflection property of the first substrate layer, and a second deflection property of the second substrate layer that is different than the first deflection property, and ii) determining, based on the normalized parameter values, the magnitude of the force of the external contact.

In some implementations, determining the magnitude of the force of the external contact includes: i) identifying, based on a signal received from a sensor of the electronic device, a property of a protective housing in which the electronic device is encased; ii) normalizing parameter values of the received input signals based on the property of the protective housing, and iii) determining, based on the normalized parameter values, the magnitude of the force of the external contact.

In some implementations, identifying the property of the protective housing includes: i) detecting that the electronic device has been received by the protective housing, ii) in response to detecting that the electronic device has been received by the protective housing, identifying machine-readable data that is affixed to the protective housing, and iii) identifying, based on the machine-readable data, the property of the protective housing. In some implementations, determining the distribution forces includes generating a distribution profile by: i) executing Gaussian distribution logic to generate a data structure comprising parameter values for input signals generated by the multiple sensors in response to the external contact, and ii) determining, based on at least a subset of the parameter values, the location of the external contact.

In some implementations, the method further includes determining that the external contact includes one of: i) a swipe along the edge of the electronic device, ii) a tap on the edge of the electronic device, or iii) a squeeze at two edges of the electronic device. In some implementations, the method further includes determining that the external contact includes an inadvertent user input. In some implementations, the sensing criteria includes at least one of: i) a threshold magnitude of force, such that the sensing criteria is satisfied in response to detecting that the determined magnitude of the force of the external contact exceeds the threshold magnitude of force; ii) a threshold time duration, such that the sensing criteria is satisfied in response to detecting that a time duration of the external contact exceeds the threshold time duration, or is below the threshold time duration; or iii) a particular location of the external contact, such that the sensing criteria is satisfied in response to detecting that the determined location of the external contact corresponds to the particular location.

In some implementations, the electronic device includes a proximity sensor and a motion sensor, and the method further includes at least one of: i) adjusting the threshold magnitude of the force based on data being received from the proximity sensor or the motion sensor satisfying proximity or movement criteria; or ii) adjusting the threshold time duration based on data being received from the proximity sensor or the motion sensor satisfying the proximity or the movement criteria.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments and can result in one or more of the following advantages. The force-sensitive interface described herein enables additional types of user input. For example, the force-sensitive interface described herein may enable a computing device to recognize a wide range of force- or pressure-dependent swipe, tap, and squeeze gesture inputs.

Further, a computing device can use such a force-sensitive interface to detect external contexts associated with an environment in which the device is present. For example, the computing device can analyze forces applied to the sensor interface to determine that the device is being held by a particular hand of a user, or that the device has been placed in a hand bag or user pocket. The utilization of device computing resources, such as system memory and processor clock cycles, can be reduced by analyzing force-sensitive inputs and determining that currently applied inputs indicate that the device is being carried with a user that is running, is stowed in a bag, or is in a pocket, as some of the many different options.

Further, the described force-sensitive interface uses strain gauge sensors that may be implemented in electronic devices using fewer circuit components (wires, capacitors, etc.) relative to other sensor interfaces. Electronic devices that incorporate the described force-sensitive interface may have reduced power consumption requirements and thus may require less power to enable sensing functions relative to mechanical button interfaces.

Details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Current electronic devices offer limited mechanisms to receive user inputs. For example, modern touch screens and mechanical buttons of electronic devices do not generally provide options for force- or pressure-dependent swipe, tap, and squeeze gesture inputs. Further, current devices may not adjust user input mechanisms based on the external contexts or use environments of the device.

Electronic device inputs that rely on forces applied to force-measurement gauges can offer simpler, more user-friendly, and more intuitive methods for interacting with devices than other user input mechanisms. Hence, systems and methods described in this specification detail a force-sensitive interface for receiving multiple types of user input to an electronic device. The multiple types of user input may include swiping, tapping, squeezing, time-based squeezing, or frequency-based tapping. Further, the described systems can supplement or replace physical buttons that protrude above an exterior surface of the device.

Circuit components of an electronic device may receive multiple analog sensor signals that are generated when strain is applied to the device's strain gauge sensors. Processor components of the device may be configured to convert the analog signals into meaningful parameter values that indicate forces applied by a user to the edge or sidewall of the device and the location of those applied forces, which may differ from the strains experienced by various strain gauges of the device. An electronic device may execute numerous user input actions (e.g., launching an application, adjusting volume, modifying vibration mode, etc.) based on determining that user input contacted a sidewall/edge of the electronic device.

In particular, at least one sensor may detect strain or force in response to user contact that supplies contact force to an exterior surface or device edge that happens to be adjacent to the at least one sensor, where the at least one sensor is affixed at an inner surface of the device housing. Accordingly, this specification describes systems and methods that utilize force-sensitive inputs to determine an external context of the electronic device (e.g., how the device is being touched or carried). Methods include executing user input actions that are tailored to the detected external context.

Figure 1:
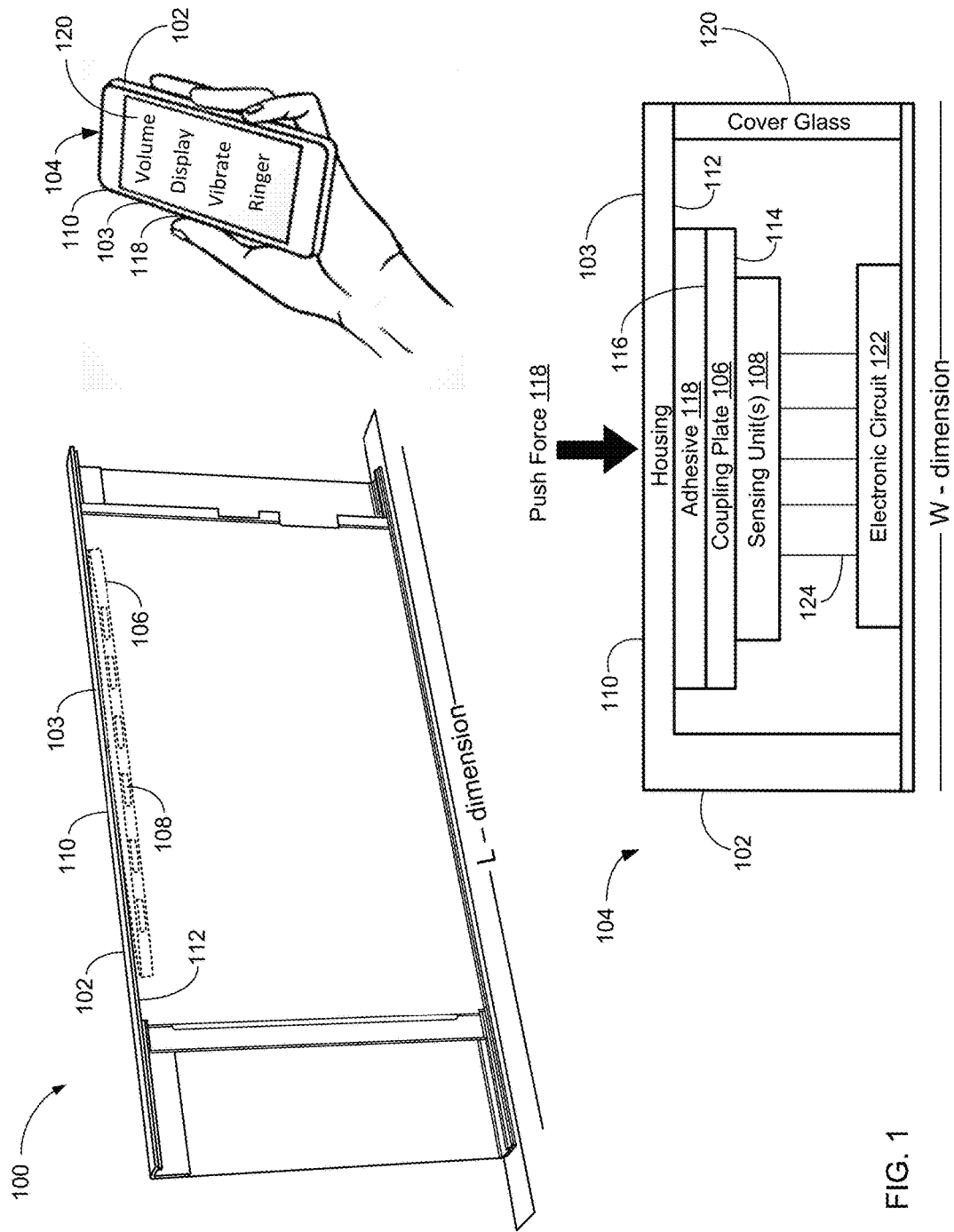
FIG. 1 shows diagrams associated with an apparatus for sensing user input to an example electronic device.

FIG. 1 depicts diagrams associated with an apparatus 100 for sensing user input to an example electronic device. Apparatus 100 generally includes a housing 102 that can later receive multiple electronic components to form user device 104. In general, user device 104 may include smartphones, mobile devices, cellular devices, smart televisions, laptop computers, tablet computers, notebook computers, desktop computers, electronic readers, or a variety other types of computing devices or consumer electronic devices.

Apparatus 100 further includes coupling plate 106 and multiple strain gauge sensing units 108 (hereinafter "sensing unit 108"). As discussed in more detail below, each sensing unit 108 may include multiple strain gauges that form sets of strain gauges that are arranged in a particular configuration within the sensing unit. As generally shown, housing 102 includes a housing wall having an outer surface 110 corresponding to a first side of the wall and an inner surface 112 corresponding to a second side of the wall that is opposite the first side. Similarly, plate 106 has a first side 114 and a second side 116 that is opposite the first side 114.

In some implementations, plate 106 may include multiple sensing units 108 affixed to first side 114. As shown, plate 106 may be affixed or bonded to inner surface 112 by adhesive 118 that can be disposed generally intermediate second side 116 and housing wall 103. Plate 106 may be formed from a variety of different materials such as steel, fiberglass, hardened plastic or other materials having properties that enable plate 106 to be affixed to wall 103. Adhesive 118 can be any adhesive material or compound such as glue, epoxy resin, bonding agent, or other materials suitable to securely affix/attach plate 106 to inner surface 112 of housing wall 103. Additionally, although identified as an adhesive, a variety of mechanical based fastening means suitable to securely affix/attach or couple plate 106 to inner surface 112 may also be utilized.

Housing 102 receives multiple electronic components to form user device 104, which includes cover glass 120. Hence, apparatus 100 may include an example electronic circuit 122 that is disposed internally within device 104. Wire(s)/conductor(s) 124 can electrically couple, to circuit 122, one or more strain gauge sets within sensing unit 108.

As discussed in more detail below, an example user may provide a particular type of user input to device 104 by applying a push force 118 that may vary in push force magnitude and push force duration and/or frequency. Push force 118 provides a corresponding strain force that is applied to a particular strain gauge set in respective sensing units 108 affixed to inner surface 112 of housing wall 103. In general, sensing units 108 may be arranged in particular configurations to sense/detect applied strain along, for example, a lengthwise (L) dimension of device 104 and/or a widthwise (W) dimension of device 104.

The applied strain can be detected by a parameter signal received by one or more components of circuit 122. A value of the detected parameter signal can correspond to a particular type of user input. In some implementations, the type of user input may be viewable via a display device through cover glass 120. Different input types include, for example, user input to adjust an audio volume output of user device 104, user input to activate or deactivate a display device of user device 104, user input to activate or deactivate a vibrate mode of user device 104, and/or user input to adjust the volume of a ring tone of user device 104. In alternative implementations, a variety of different user input types may be detected based, at least in part, on a particular value of the detected parameter signal.

As an example, apparatus 100 may be used in the following implementation. A user, Frank, wants to change the volume on a computing device, e.g., Frank's smartphone. Apparatus 100 may be implemented within Frank's smartphone such that sensing units 108 are disposed along, for example, a lengthwise edge of Frank's smartphone. When Frank presses a part of the smartphone housing associated with a volume setting a particular strain gauge within sensing unit 108 is strained.

In response to the press applied by Frank, a change in a differential voltage value is detected by an electronic circuit disposed within Frank's smartphone. The smartphone can be configured to detect the differential voltage value and associate particular values with, for example, a volume press because the detected voltage change exceeds a threshold voltage change. A duration of the voltage change is measured, and the electronic circuit (which can be part of a microprocessor) outputs a value which indicates to the microprocessor that it is to change the volume of an audio signal that is being output by a speaker of Frank's smartphone.

Figure 2:
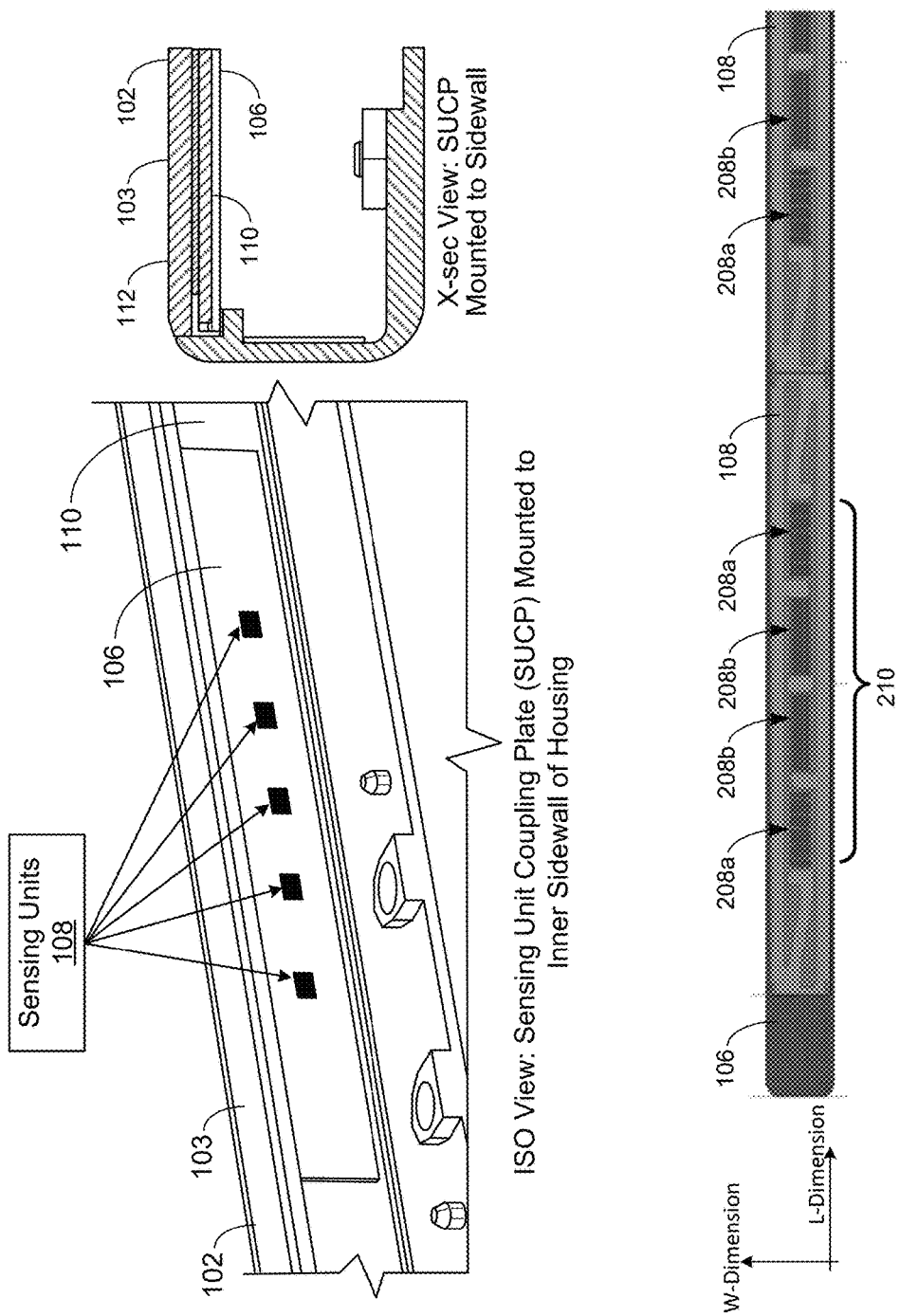
FIG. 2 shows diagrams that include multiple strain gauges that may be used in the apparatus of FIG. 1.

FIG. 2 illustrates diagrams that include multiple strain gauge units that can be used in sensing units 108 of apparatus 100. As shown, the implementation of FIG. 2 includes multiple technical features described above with reference to FIG. 1. In particular, FIG. 2 illustrates, in part: 1) an isolation (ISO) view that generally depicts multiple individual sensing units 108 attached to plate 106 that is affixed to inner surface 110 of housing wall 103; and 2) a cross-section (X-sec) view that depicts plate 106 attached/affixed to inner surface 110 of housing wall 103.

Each sensing unit 108 can include multiple strain gauge units 208 that form sets of strain gauges that are arranged in a particular configuration within sensing unit 108. In some implementations, at least two strain gauges 208 can form a strain gauge set 208a/b and multiple strain gauge sets 208a/b can form a strain gauge grouping 210. When disposed against, or affixed to, inner surface 110, multiple strain gauge sets 208a/b can be arranged in particular orientations relative to each other. For example, a first strain gauge set 208a can be arranged in a first orientation corresponding to a first dimension so as to detect or measure applied strain along the first dimension. Likewise, a second strain gauge set 208b can be arranged in a second orientation corresponding to a second dimension so as to detect or measure applied strain along the second dimension.

In general, the first orientation and the first dimension can be different from the second orientation and the second dimension. In some implementations, when user device 104 is positioned generally longitudinally upright (e.g., when held by a user), the first orientation can correspond to a vertical orientation and the first dimension can correspond to a lengthwise (L) dimension. Further, when in this longitudinally upright position, the second orientation can correspond to a horizontal orientation and the second dimension can correspond to a widthwise (W) dimension.

In the implementation of FIG. 2, when disposed within user device 104, strain gauge grouping 210 can have a strain gauge set 208a that includes two strain gauges 208 disposed in a horizontal orientation (when the device is upright) to measure applied strain to surface 112 in the widthwise dimension. Moreover, strain gauge grouping 210 can also have a strain gauge set 208b that includes two strain gauge units 208 disposed in a vertical orientation (when the device is upright) to measure applied strain in the lengthwise dimension. As shown, strain gauges 208 of strain gauge grouping 210 can each be arranged in a parallel configuration, relative to each other, and can be disposed generally along the lengthwise dimension of a wall 103 (e.g., a sidewall) of housing 102.

When installed within user device 104, each strain gauge grouping 210 of sensing unit 108 can be used to detect or sense user input in the form of applied force to surface 112. The applied force can cause strain gauges 208 to change in electrical characteristics, to cause the electronic circuit 122 to sense an increased strain. User device 104 can be configured to recognize the increased strain as corresponding to different user input types such as a user pushing, swiping, tapping, squeezing or otherwise touching a particular area on a sidewall wall of user device 104.

For example, when a user pushes on an edge or sidewall of housing 102 that is adjacent a strain gauge 208, the housing and plate 106 can bend or flex, causing strain gauge 208 to change in electrical characteristics (e.g., a resistance of resistors change within a particular strain gauge), which affects the voltage of an electrical signal applied to strain gauge 208 and which causes the electronic circuit 122 (analyzing the electrical signal) to sense an increased strain along, for example, the lengthwise dimension of device 104. Accordingly, user device 104 senses a push on the edge of a housing 102 and can indicate to the user, via an example display device (protected by cover glass 120), the particular input type associated with the user's push/touch. In some implementations, multiple sensing units 108 can be disposed or positioned along an edge or sidewall of housing 102 in order to sense or detect the particular input type and/or the proximate location of the push applied along the length of device 104. The electronic circuit 122 can analyze the electrical signal that is received from each of the strain gauge set 208a and strain gauge set 208b.

As an overview of the terminology used herein, user device 104 may include multiple sensors or sensing units 108. Each sensing unit 108 may include two strain gauge sets indicated as features 208a and 208b. As an example, strain gauge set 208a can be oriented vertically and strain gauge set 208b can be oriented horizontally. Each strain gauge set 208a or 208b includes two individual strain gauge units 208. More particularly, and stated another way, each sensing unit 108 includes four strain gauge units 208 or resistors 208 (discussed below with reference to FIG. 3) which form the two strain gauge sets 208a/b or circuit branches (discussed below with reference to FIG. 3). Reference feature 210 refers to a strain gauge grouping that includes the four individual strain gauges 208 that collectively form a single sensor 108.

Figure 3:
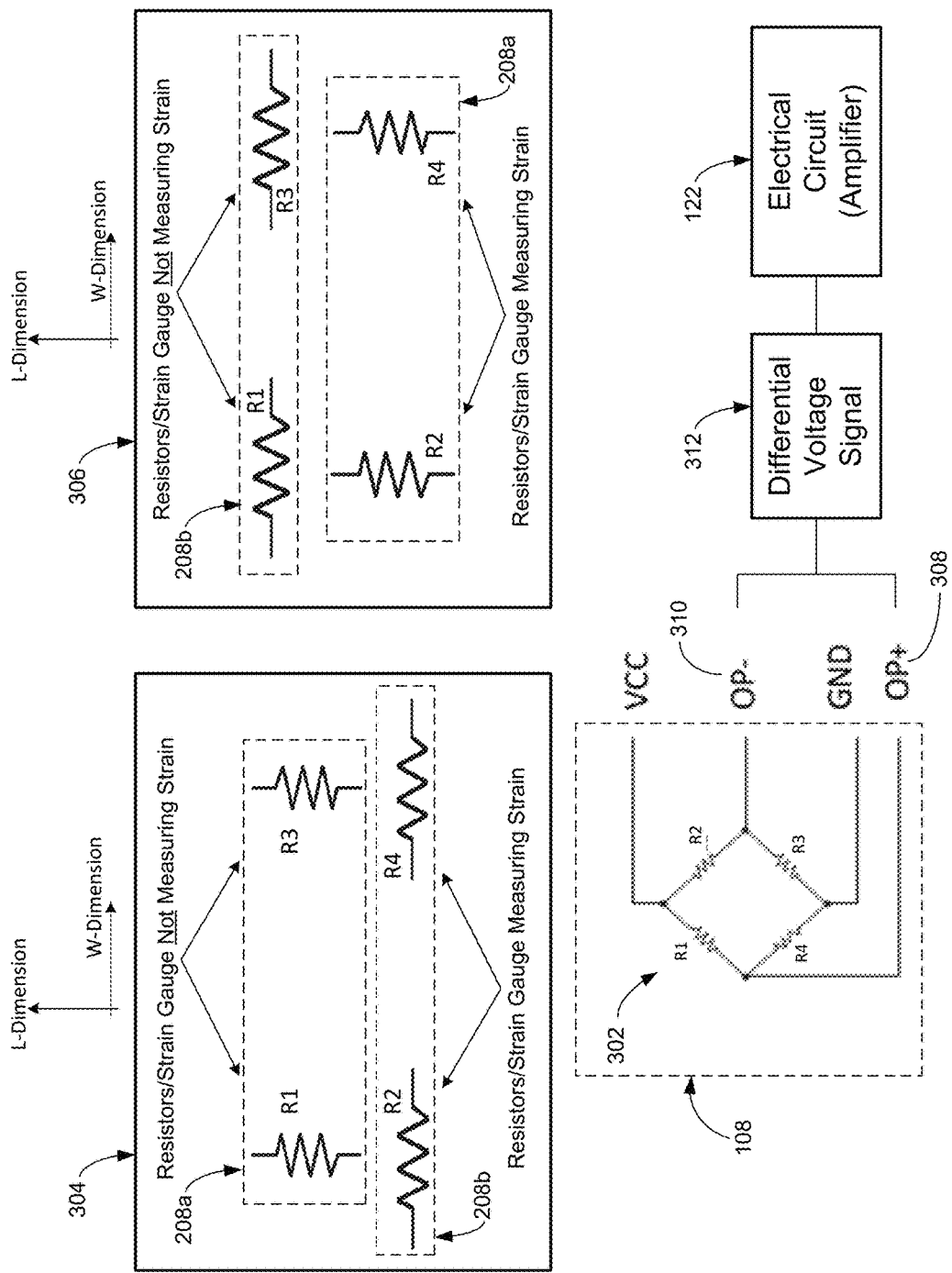
FIG. 3 shows diagrams that include resistor configurations and an example bridge circuit that may be implemented to sense user input to an electronic device.

FIG. 3 illustrates diagrams that include resistor configurations and an example bridge circuit 302 that can be used to sense user input to an electronic device. As discussed above, each sensing unit 108 includes multiple individual strain gauges 208 that each have a dynamic resistance attribute that translates to a particular resistance value measured in ohms. As used in this specification, dynamic resistance attribute pertains to a resistance or electrical characteristic of strain gauge 208 that changes in response to strain force applied to strain gauge 208 (e.g., user pushing on the strain gauge). Thus, a change in the resistance attribute of strain gauge 208 will translate to a change in a measured resistance value of strain gauge 208. Hence, as shown in FIG. 3, in alternative implementations, strain gauge 208 can be depicted as one of resistors R1-R4 that each have an initial or predefined resistance value based on the dynamic resistance attribute of strain gauge 208. In particular, sensing unit 108 can be modeled or depicted as bridge circuit 302 that includes positive (voltage polarity) output 308 and negative (voltage polarity) output 310.

As shown, in some implementations, resistor orientation 304 can include resistors R2 and R4 having a horizontal orientation so as to measure applied strain in the widthwise (W) dimension, while resistors R1 & R3 (vertical orientation) remain relatively fixed when strain is applied due to their orientation and, thus, do not measure applied strain. In contrast, resistor orientation 306 can include resistors R2 and R4 having a vertical orientation so as to measure applied strain in the lengthwise (L) dimension while resistors R1 & R3 (horizontal orientation) remain relatively fixed when strain is applied due to their orientation and, thus, do not measure applied strain.

In general, when a particular set of resistors are disposed perpendicular to a particular strain direction, that particular resistor set will generally not measure strain associated with that particular strain direction. For example, as shown in resistor orientation 304, for a strain force applied in the widthwise (W) dimension/direction, strain gauge set 208a is perpendicular to the strain direction and, thus, will generally not measure applied strain. However, strain gauge set 208b is parallel to the strain direction and will measure applied strain. Further, as shown in resistor orientation 306, for a strain force applied in the lengthwise (L) dimension/direction, strain gauge set 208b is perpendicular to the strain direction and, thus, will generally not measure applied strain. However, strain gauge set 208a is parallel to the strain direction and will measure applied strain.

In general, bridge circuit 302 includes two branches. A first branch is indicated by R1 & R3 and the output node (for output 308) intermediate R1 & R3. A second branch is indicated by R2 & R4 and the output node (for output 310) intermediate R2 & R4. Bridge circuit 302 can receive an applied voltage (VCC). Electronic circuit 122 can receive or detect a differential voltage signal 312 in response to a change in the resistance attribute of any one of resistors R1-R4. In some implementations, circuit 122 provides the VCC voltage signal and can then execute a basic comparator circuit to analyze signal 312 relative to the VCC signal. The analysis can enable circuit 122 to detect or determine the extent to which the measured value of signal 312 indicates a deviation from the initially applied VCC voltage value.

During operation, and when disposed along inner surface 110 within user device 104, sensing unit 108 can detect applied strain in response to a touch force that is applied to a certain location of housing wall 103 (e.g., an edge/sidewall of user device 104). For example, and as noted above, user input in the form of applied strain to the edge of device 104 can cause parameter signals to be received by electronic circuit 122. The parameter signals can be received in response to user input detected by sensing unit 108, e.g., strain gauge grouping 210, and can indicate a user input of a particular type, e.g., volume adjustment, activate vibrate mode, etc. Hence, detection of the user input can cause a corresponding response from device 104, e.g., indication on the display device associated with a volume level increasing or decreasing.

For example, and with reference to bridge circuit 302, sensing unit 108 can include strain gauge set 208a (resistors R1 & R3) that indicates a parameter signal having a first voltage value (via output node 308). Sensing unit 108 can further include strain gauge set 208b (resistors R2 & R4) that indicates a parameter signal having a second voltage value (via output node 310). The first voltage value and the second voltage value can be indicated concurrently in response to the user input of a particular type that causes a particular corresponding response from user device 104.

In some examples, applied strain in the W-dimension can cause physical changes to strain gauge set 208b that in turn causes the resistance value of resistors R2 & R4, measured in ohms, to change (either increase or decrease) by a predefined amount based on the magnitude of the applied force. Accordingly, presuming all resistance values in circuit 302 are generally the same, the change in a resistance attribute of R2 & R4 will cause a corresponding change in the voltage value measured at output 310. Thus, a differential voltage signal 312, relative to outputs 308 and 310, will be measured or detected by electronic circuit 122. In some implementations, measured parameter signals can be, for example, in the microvolt or the millivolt range. Thus, measured signals can be amplified by an example amplification circuit associated with electronic circuit 122.

Figure 4:
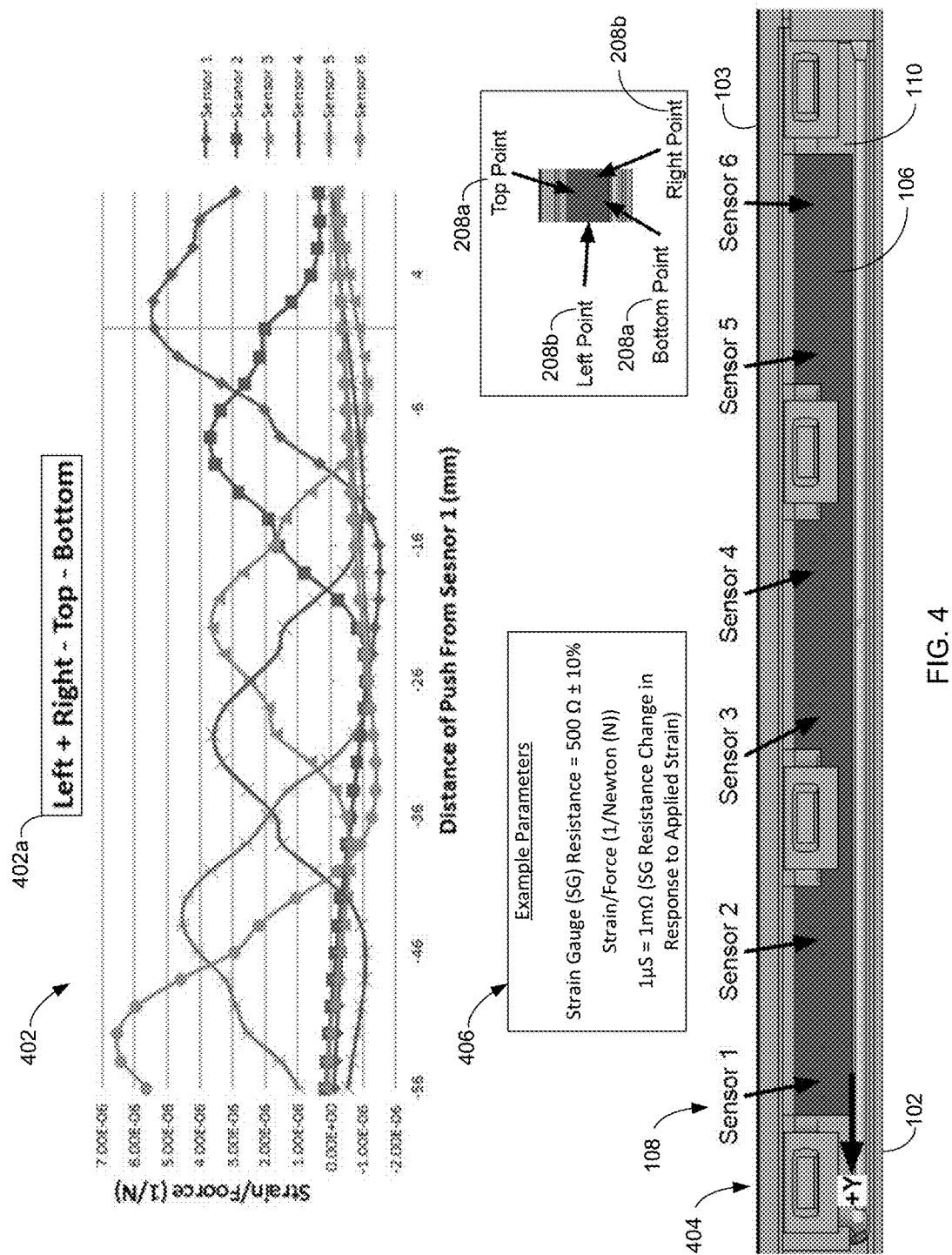
FIG. 4 shows a diagram of multiple strain gauge sensors and corresponding graphical data associated with individual sensor measurements.

FIG. 4 illustrates a diagram 404 of multiple strain gauges 208 arranged in a diamond configuration to form multiple sensing units 108 as well as corresponding graphical data 402 associated with individual sensor measurements that indicate a particular strain force for respective sensors. The implementation of FIG. 4 further illustrates example data parameters 406 associated with the technical features of apparatus 100. As shown, each sensing unit/sensor 108 can have a strain gauge set 208a that includes a strain gauge 208 in the top point position and a strain gauge 208 in the bottom point position. Likewise, each sensor 108 can also have a strain gauge set 208b that includes a strain gauge 208 in the left point position and a strain gauge 208 in the right point position. The diamond configuration of the strain gauges 208 depicted in the embodiment of FIG. 4 differs slightly from the parallel configuration of the strain gauges 208 depicted in the embodiment of FIG. 2.

In general, a diamond configuration can be used to form a sensing unit 108 that is more compact (relative to the parallel configuration) along a length of device 104. Use of the diamond configuration can provide increased precision relative to the location of push and potentially higher signal 312 for the same applied load. Alternatively, in some implementations, the parallel configuration, discussed above, can use a smaller width such that sensing units that include strain gauges arranged in the parallel configuration can be utilized on thinner electronic devices. Moreover, the parallel configuration can provide a simplified installation process when being placed within electronic devices that have limited space.

In general, a variety of different strain gauge orientations can be used for apparatus 100 depending on a device manufacturer's desired level of precision, the manufacturer's desired accuracy regarding the ability to detect the particular location of an electronic device that a user is pushing, and the available space within the electronic device that apparatus 100 will be installed.

As noted above, applied strain/force to an edge/sidewall surface associated with housing wall 103 can cause slight physical changes (e.g., expansion or contraction) to at least one strain gauge 208 of sensor(s) 108. The physical changes can cause a change in a resistance attribute of strain gauge 208. The change in the resistance attribute can cause a corresponding change in the measured output voltage value, thereby causing differential voltage signal 312. In some implementations, equation 402a indicates that, for the strain gauge diamond orientation of FIG. 4, total top & bottom voltage values can be subtracted from total left & right voltage values to obtain a differential voltage value. For example, differential voltage signal 312 can correspond to adding the measured voltage values associated with strain gauge set 208b (positive polarity) and subtracting the measured voltage values associated with strain gauge set 208a (negative polarity) to obtain a differential voltage value that can be mapped to a particular strain force.

In some implementations, a particular strain force can be mapped to a particular voltage value associated with differential voltage signal 312. The applied strain force can be measured in strain units and a particular strain value can correspond to a particular resistance attribute change for each individual strain gauge 208. For example, a magnitude of applied force provided as user input to device 104 can be indicated as one micro-strain (μS). Micro-strain is indicated by units of applied strain for the y-axis of graph 402 (e.g., 1.00E-06) and that corresponds generally to applied strain per one Newton of force. Hence, 1 μS can correspond to a 1 mΩ change in the resistance value associated with a single strain gauge 208 (e.g., resistor R2 of FIG. 3). In particular, for an example resistance value of 500Ω±10%, an applied strain of 6.5 μS (see sensor 6 of graph 402) can result in a modified resistance value of 506.5Ω±10%. In some implementations, a range of differential output voltage signal values can be mapped to individual user input types. The mapped values can be used by user device 104 to determine particular user input types based on the duration and/or magnitude (in units of strain-force) of the applied strain.

Figure 5:
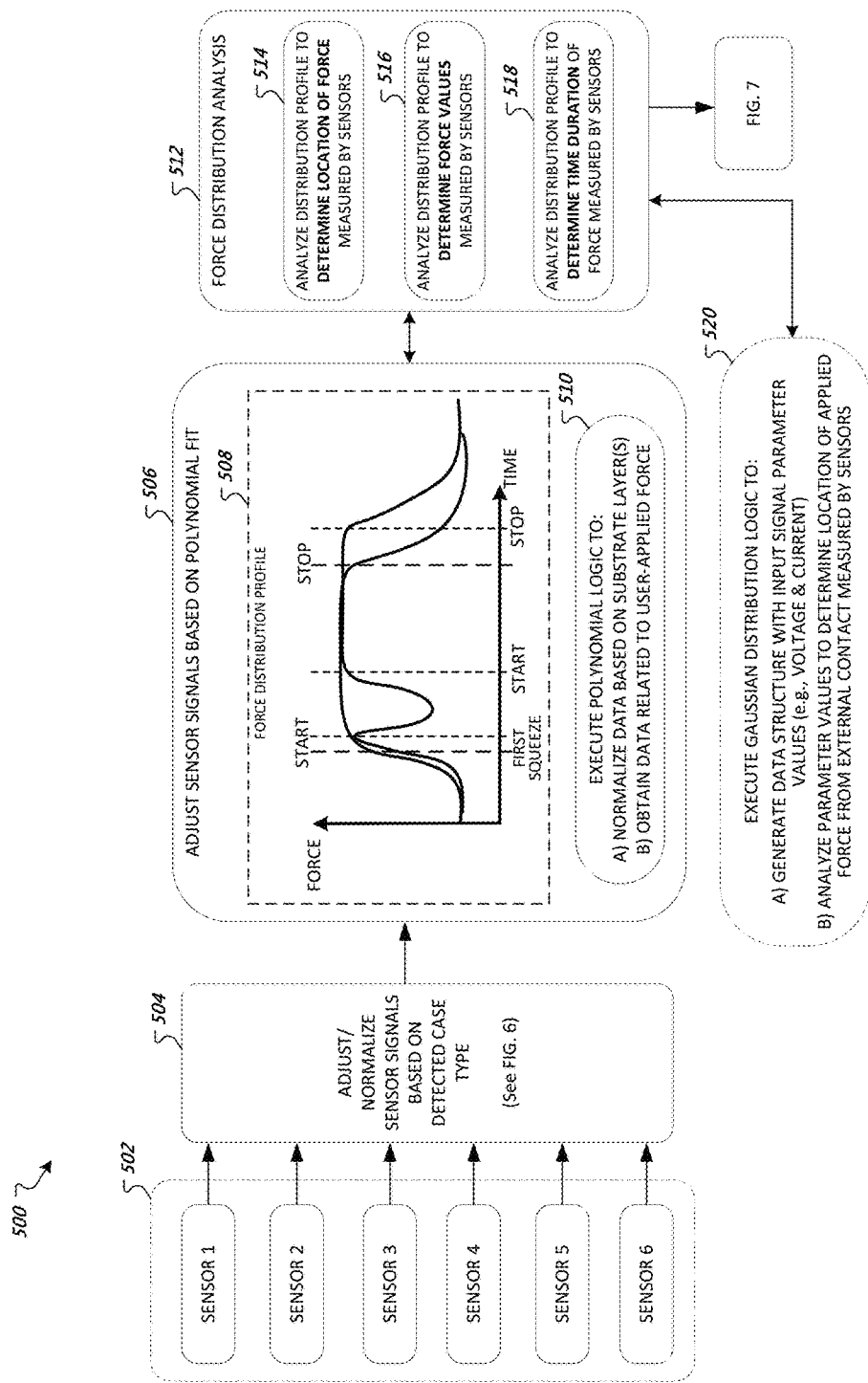
FIG. 5 shows a block diagram depicting a process flow for adjusting input signals received from multiple sensors.

FIG. 5 shows a block diagram depicting a process 500 or logical flow chart for adjusting input signals received from multiple strain gauge strain gauge sensors 502. In general, strain gauge sensors 502 can correspond to multiple individual strain gauge sensors 108 discussed above with reference to at least the implementation of FIG. 1. The described actions of process 500 can be enabled by computing logic or programmed instructions that are executable by a processor and memory of an example electronic device, such as user/computing device 104 discussed above.

For example, in some implementations, device 104 can include one or more processors, memory, and data storage devices that collectively form a computing system of user device 104. The processors of the computing system process instructions for execution within device 104, including instructions stored in the memory or on the storage device to display graphical information for a GUI on an example display of user device 104. Execution of the stored instructions can cause one or more of the actions described herein to be performed by user device 104.

In other implementations, multiple processors may be used, as appropriate, along with multiple memories and types of memory. For example, user device 104 may be connected with multiple other computing devices, with each device (e.g., a server bank, groups of servers, or a multi-processor system) performing portions of the actions or operations associated with the various processes or logical flows described in this specification.

In general, multiple strain gauge sensors 502 ("sensors 502") may be disposed along an inner sidewall or edge of device 104, such that the sensors 502 are covered by a housing of the electronic device (e.g., no portion of the sensor or portion of a user input device specific to sensors 502 is present from an external viewing of an assembled device 104). Sensors 502 generate sensor signals (e.g., parameter signals) in response to contact at an external edge of device 104. For example, an electronic circuit of a computing system of device 104 can be electrically coupled to each sensor (1 to 6) of sensors 502. Thus, the computing system can be configured to receive sensor input/parameter signals in response to user input that interacts with an exterior surface of a sidewall or edge of device 104.

For example, external contact or user input to an edge (or other area) of device 104 can include strain or force that is applied to an external area of an outer surface of device 104. In some instances, the force applied to the external area can be adjacent to, or substantially adjacent to, a particular sensor(s) of sensors 502. As indicated above, the sensors may be affixed to an inner surface of device 104 on the other side of a housing wall that defines inner and outer/external surfaces of device 104.

Referring now to process 500, in accordance with the described teachings, sensors 502 generate sensor signals (e.g., output signals) that are received as input signals by a computing system of device 104. The received sensor input signals may be normalized based on signal processing performed by the computing system. For example, at box 504, the computing system adjusts or normalizes input signals from sensors 502 based on a detected case type of a protective case or protective housing that receives, and at least partially encloses, encases, or covers, device 104.

Adjusting or normalizing input signals based on detected case type is described in more detail below with reference to FIG. 6. As used throughout this specification, "based on" does not necessarily mean "exclusively based on" (i.e., there may be other factors used). For example, "based on" as used herein may include other factors, features or items of the disclosed technology that may be used to bring about a particular result.

In response to external contact to the edge of device 104, the computing system receives input signals from sensors 502 and then uses the received input signals to determine a distribution of forces applied to sensors 502. Stated another way, the computing system may determine a distribution of forces applied to sensors 502 based on the input signals generated by sensors 502 in response to external contact to the edge of device 104. For example, at box 506, determining the distribution of forces applied to the multiple sensors can include the computing system generating an example force distribution profile 508. In some instances, profile 508 is generated and stored in an example memory of device 104 and can be referenced for on-going signal distribution analysis by the computing system (see e.g., box 512).

As shown, force distribution profile 508 can provide a graphical representation of example input or voltage signals that indicate force applied to an edge of device 104. In some implementations, profile 508 indicates respective characteristics of at least two input signals received and processed by the computing system. The input signals can correspond to measured force applied to an edge of device 104 for a given time duration.

The respective characteristics of the input signals can include, for example: i) a first squeeze applied to an exterior or edge of device 104, ii) an input force detection start that corresponds to contact force exceeding a particular threshold force, and/or exceeding a particular threshold time, or iii) an input signal detection stop that corresponds to contact force falling below a particular threshold force (each described in more detail below).

Referring again to box 506, in some implementations, the computing system can include programmed instructions corresponding to polynomial logic for use in adjusting one or more received signals based on a particular polynomial fit. In some implementations, sensors 502 may be calibrated using a polynomial correction such that sensor signal values can be normalized or adjust based on a variety of factors. For example, using polynomial correction logic can allow for each sensor response to be calibrated to provide the same, or matching, response curves, regardless of sensor manufacturing tolerances.

In some implementations, using polynomial correction allows for each sensor response to be calibrated to provide matching response curves that account for certain properties of one or more substrate layers (e.g., sidewall, rubber gaskets, etc.) of device 104. For example, device 104 may have a single or multiple substrate layers that have deflection properties that affect input signal values generated by sensors 502 in response to external contact to device 104. In particular, device 104 can include a first substrate layer and at least a second substrate layer that are each disposed intermediate the exterior surface of the device and one or more of sensors 502.

In some implementations, the first substrate layer can have a first deflection property that affects a slope or other input signal values of respective sensors 502 based on differing levels of force applied at an edge of device 104. Likewise, the second substrate layer can have a second deflection property that also affects a slope or other input signal values of respective sensors 502 based on differing levels of force applied at an edge of device 104. In some instances, the first deflection property and the second deflection property each affect a slope or signal values of sensors 502 in different ways.

This can result in the level of strain being detected by sensors 502 differing throughout an even application of force to the side wall, based on a level of deflection of the side wall. For example, it may be easy to initially deflect the side wall, but once the deflection requires significant distortion of a first substrate layer (which may be more rigid than an outer portion of the housing), the same or even a greater application of force may result in less deflection of the sidewall and less strain than similar additional applications of force. Once the application of force requires distorting not only the first substrate layer but also the second substrate layer, the application of force for a given increase in strain may increase even further, but with a different increase than when properties of the first substrate layer were added into consideration.

So, as indicated above, using polynomial correction allows each sensor to provide matching response curves that account for differing deflection properties of one or more substrate layers. Hence, at box 510, the computing system can execute polynomial logic to: a) normalize received sensor signals based on certain substrate layer(s) of device 104, and b) obtain data (e.g., signal parameter values such as voltage/current) relating to force applied to device 104 based on the external contact.

In some instances, response curves may be non-linear or signal values affected by deflection properties, or other factors, may vary relative to each other when substantial force is being applied to an edge of device 104. In this instance, baseline drift may occur due to electric signal fluctuations. Hence, in addition to the polynomial correction logic, at least one high-pass filter can be included to remove baseline drift relative to output signals generated by sensors 502 (e.g., input signals to an electric circuit of the computing system).

At box 512, device 104 performs force distribution analysis on the determined distribution of forces. For example, the computing system of device 104 can analyze distribution of forces data indicated by force distribution profile 508 to: i) determine the location of forces measured by sensors 502 (box 514); ii) determine force values measured by sensors 502 (box 516); and iii) determine time duration of force measured by sensors 502 (box 518). Determined force values may correspond to, or be indicative of, a magnitude of force applied to an edge or sidewall of device 104 in response to contact at an external edge or sidewall of the device. In some instances, force applied to an edge or sidewall of device 104 in response to contact at an external edge or sidewall of the device may correspond to, or translate to, force applied to one or more of sensors 502.

At box 514, based on an analysis of the distribution of forces that were applied to sensors 502, the computing system then determines the location of the external contact that: i) was applied to device 104 by way of force applied at an edge or sidewall of the device, ii) caused sensors 502 to generate the received input signals, and iii) specifies a location that is offset from each of sensors 502.

For example, the computing system can include programmed instructions corresponding to Gaussian distribution logic for use in determining the distribution of forces and for use in determining the location of the external contact. Hence, at box 520, the computing system of device 104 can execute Gaussian logic to: a) generate an example data structure having parameter values (e.g., voltage and current values) for input signals generated by sensors 502; and b) analyze the parameter values of the data structure to determine location(s) of the external contact measured by sensors 502. As a simple illustration, should strain be detected only at sensor 1 and sensor 2, with slightly greater strain detected at sensor 1, the computing system may use Gaussian logic to determine that the external contact was applied at a location of the device housing that is between sensor 1 and sensor 2, but closer to sensor 1.

In some implementations, determining the distribution forces includes executing Gaussian distribution logic to generate force distribution profile 508. Further, determining the location of the external contact can include using, or extracting, signal/parameter values associated with profile 508 to generate a data structure having parameter values for respective input signals generated by sensors 502 in response to the external contact. Accordingly, in some instances, parameter values of the generated data structure can be mapped to input signal curves of profile 508.

The computing system can then use and/or analyze at least a subset of the parameter values to determine the location data of the external contact. For example, the computing system can map or associate certain signal values to particular sensors and can determine the location of the external contact based on this mapping or association. In some instances, the computing system determines location data of an external contact and the data may specify a location that is central to, or offset (e.g., slightly or substantially offset) from, each of sensors 502.

At box 516, the computing system determines force values for input signals generated by the respective sensors 502 based on the analysis of the distribution of forces that were applied to the multiple sensors. In some instances, the determined force values indicate a certain input magnitude of the force of the external contact, and corresponds to a particular type of external contact (e.g., a swipe, a tap, or a squeeze). Particular types of external contact are described in more detail below with reference to FIG. 7.

In some implementations, the computing system determines the force values after parameter values of the input signals have been normalized or adjusted based on the one or more substrate layers of device 104. Likewise, in some instances, force values may be determined after parameter values of the input signals have been normalized or adjusted based on a particular type of protective case that receives device 104 (described in more detail below).

For example, and with regard to normalizing/adjusting signal values, in response to external contact at an edge of device 104, a first sensor (e.g., sensor 4) experiences strain based on force applied from the external contact. Likewise, in response to external contact at an edge of device 104, a second sensor (e.g., sensor 5) experiences strain based on force applied from the external contact. Sensor 4 may generate a signal value of 4.2V DC (Volts, Direct Current), while sensor 5 may generate a signal value of 5.1V DC.

In some implementations, the 4.2V DC signal generated by sensor 4 may be normalized or adjusted to 7.3V DC based on executed polynomial logic and/or based on detected case type. Likewise, the 5.1V DC signal generated by sensor 5 may be normalized or adjusted to 6.7V DC based on executed polynomial logic and/or based on detected case type. Accordingly, the computing system can then determine that the adjusted signal value of 7.3V generated by sensor 4 corresponds to a force value of 10.1N (Newtons). The computing system can further determine that the adjusted signal value of 6.7V generated by sensor 5 corresponds to a force value of 8.4N.

In some examples, the determined force value of the external contact is an estimated magnitude of the force of the external contact at the determined location of the external contact. Because the external contact may have been applied between two sensors, the actual magnitude of the force of the external contact may be distributed among the two sensors, with the device housing absorbing some of the force. As such, using known characteristics of the device housing and the signals received from the sensors, the device may be able to estimate the force that was applied to the computing device.

At box 518, the computing system executes timing logic to determine a time duration of the external contact or the force measured by sensors 502. As indicated above, determined force values may correspond to particular types of external contact (e.g., a swipe, a tap, or a squeeze). Hence, in some instances, the determined force value and the determined time duration can be used to determine a particular type of external contact (e.g., whether the external contact corresponds to a tap or a long press).

For example, a shorter time duration (e.g., less than one second) for a relatively small force value (e.g., less than 5 Newtons) may indicate swipe contact, while a similar short duration force for a medium range force value (e.g., between 5 and 15 Newtons) may indicate tap contact. Similarly, a longer time duration (e.g., greater than one second) for a relatively large force value (e.g., more than 15 Newtons) may indicate squeeze contact.

In some implementations, a variety of strategies can be used to determine, for example, that a user is squeezing device 104. These strategies relate to analysis of generated sensor signals and can include impulse based recognition, peak based recognition, pattern recognition across sensors, and recognition percentile matching.

For impulse based recognition, a computing system of device 104 can analyze both the leading edge and falling edge of an example pressure/force curve associated with signals generated by sensors 502. For the computing system to determine that user input includes a squeeze, a user may need to both squeeze and release at an edge of device 104. This impulse based recognition strategy provides benefits which can be leveraged by device 104 to prevent false triggering as well.

For peak based recognition, a defined listening window can be used by device 104 when analyzing signals generated by sensors 502. In some implementations, the computing system can detect that a user has reached a certain force threshold within a predefined amount of time for an external contact (or gesture) to be classified as a squeeze.

In some instances, the threshold force can be a dynamic threshold. For example, in a first few milliseconds of external contact, the threshold may be increased such that the force applied to the device may need to be of higher or sufficient magnitude for device 104 to detect a squeeze. While at greater than, e.g., 500 milliseconds, the force threshold can be lowered and the computing system can analyze the sensor signals to detect more sustained force rather detecting for force that exceeds a particular threshold. In other words, less force may be required to invoke a "squeeze" action if the squeeze lasts more than 500 milliseconds than if the purported squeeze only lasted 100 milliseconds.

For pattern recognition across sensors, the computing system can include an array of multiple sensors 502 across each side of device 104. In some implementations, the computing system can analyze force patterns to determine that those force patterns indicate force being applied to the device is associated with a squeeze. For example, a squeeze contact may often generate sensor signals that, upon analysis, indicate a uniform force across sensors 502 that is applied by a palm of a user's hand. In contrast to the uniform force applied by the palm, other sensor signal values may indicate that force applied from external contact indicates signal peaks for sensors that are adjacent the user's fingers.

For recognition percentile matching, the computing system can utilize each of the recognition methods mentioned above to classify a potential squeeze with a percent likelihood value. For example, external contact can be identified as an intended gesture, or squeeze, based on a percent likelihood that matches a profile (e.g., a force/time profile) defined by the computing system as being a squeeze. In some implementations, the computing system can use an example set of 10-20 squeeze profiles. External contact can be defined as a squeeze based on the extent to which a percent likelihood (e.g., force/time attributes) of the external contact matches an example set of squeeze profiles.

Figure 6:
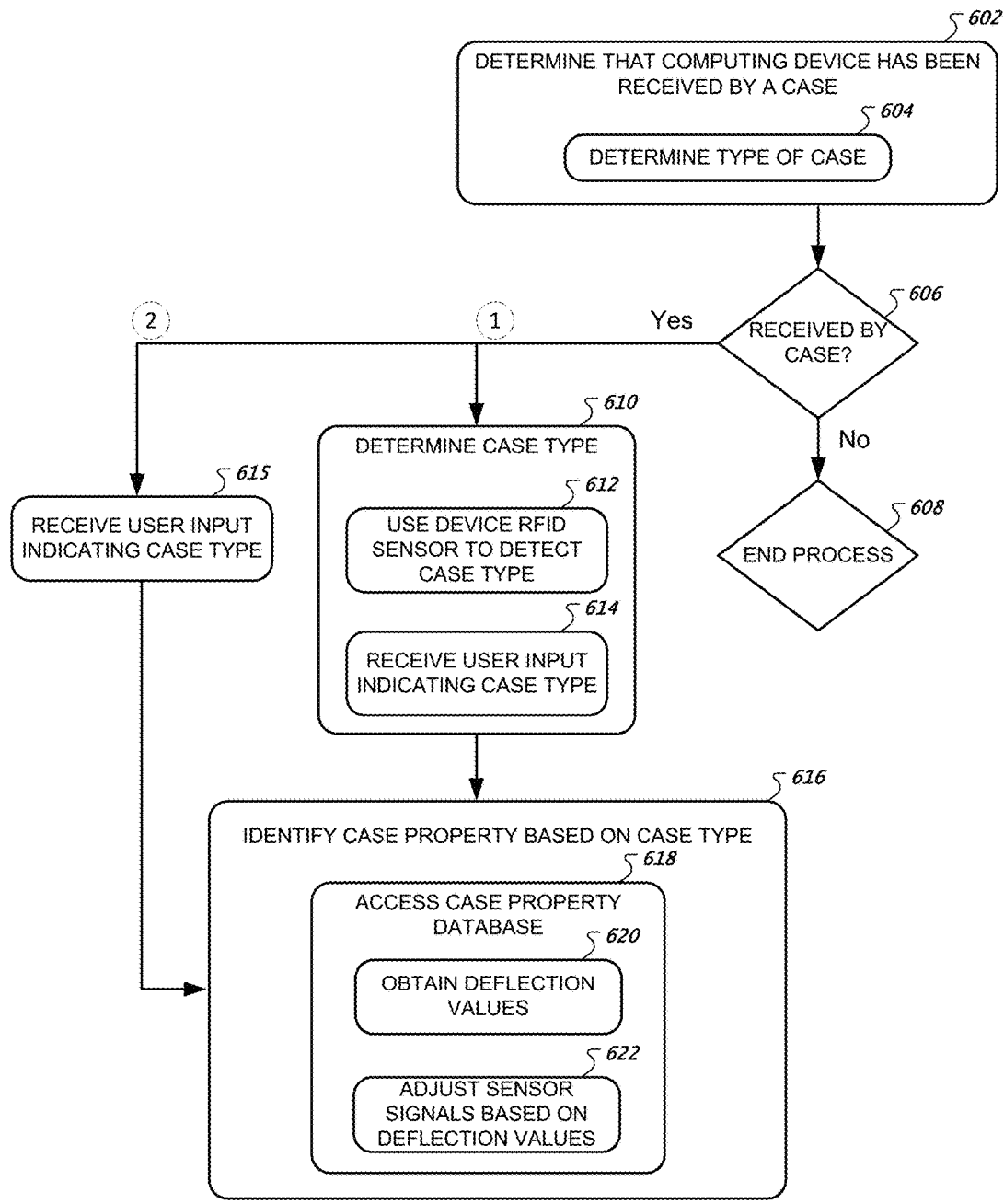
FIG. 6 shows a process flow chart for identifying properties of an example protective case that receives an electronic device.

FIG. 6 shows a process flow chart for identifying properties of an example protective case that receives an electronic device, e.g., device 104. At box 602, a computing system of device 104 determines that the device has been received by a case, such as a protective case. In some implementations, device 104 can use at least one sensor of the device to determine or detect that the device has been received by a protective case. In some instances, the at least one sensor may be a sensor that is not one of sensors 502, while in other implementations, the at least one sensor may be one or more of sensors 502.

For example, device 104 can include at least one sensor that generates sensor data based on principles associated with radio frequency identification (RFID). In some instances, the sensor can be an RFID reader configured to receive machine-readable data from a particular device in response to detecting or identifying a particular RF signal emitted by the device. In alternative implementations, in response to being received by a case, device 104 can use nominal force values that correspond to signals generated by sensors 502, e.g., from external contact by the case, to determine or detect that the device has been received by a protective case. That determination can be used to trigger activation of the RFID reader, or can be used to determine a particular "feel" of the case that may be unique to a particular case. For example, some cases may be designed to apply more force at certain locations, and the device that is held by the case may determine that the application of forces matches a force profile that is associated with a particular case.

At box 604 a process for determining the type of case includes, determining, at decision box 606, whether device 104 has been received by a protective case. If the computing system determines that the device has not been received by a case, e.g., by detecting, or not detecting, any related sensor data, then the process for determining the type of case ends at box 608.

If the computing system determines that device 104 has been received by a case, then the process for determining the type of case proceeds to at least one of two process paths. For the first process path (1), at box 610, the computing system proceeds to determine the type of case. At box 612, the computing system can use an RFID sensor of device 104 to detect the case type. For example, the sensor can be an RFID reader configured to receive machine-readable data located on, or affixed to, an interior section of the case and the data can indicate a particular type of the case.

In some implementations, the data indicates a case type by using or associating a case type with a type identifier, e.g., a numeric, alpha-numeric, or other coded identifier. In other implementations, the sensor can be any electronic reader-type device that is configured to receive, read, or otherwise capture machine-readable data located on, or affixed to, an interior section of a protective case. For example, the sensor can include barcode reader functionality and the machine-readable data can be a barcode affixed to an inner surface of a protective device case.

Alternatively, or in addition to the process of box 612, at box 614, the computing system can receive user input indicating the case type. For example, if the device is unable to detect the case type using the RFID sensor, then a user of the device can manually input a case identifier that indicates the particular case type. As shown, for the second process path (2), the operation at box 615 can be the same, or substantially the same, as the operation at box 614. In some implementations, process path (2) may be utilized for certain devices or cases that do not include RFID, or other sensor functionality for capturing or providing machine-readable data.

At box 616, the computing system can identify one or more properties of the case based on the determined case type. For example, at box 618, the computing system can access an example case property database. While at box 620, an identifier that indicates a case type can be used to obtain, from the case property database, one or more deflection properties associated with the protective case.

As indicated above, for a protective case that receives device 104, deflection properties associated with one or more substrate layers of the protective case can affect parameter values of signals generated by sensors 502 in response to external contact to the device. Hence, at box 622, a computing system can adjust or normalize input signals of sensors 502 based on a detected case type of the protective case that receives device 104.

To expand on the above description for determining force values, in some implementations, force values are determined after parameter values of signals generated by sensors 502 have been normalized/adjusted based on properties of a determined case type. For example, determining the force value can include: i) using a sensor of an electronic device to identify a property of a protective case that receives the device; ii) normalizing parameter values of the received input signals based on the property of the protective case, and iii) using the normalized parameter values to the determine the force value.

In some implementations, sensors 502 can undergo case calibration based on multiple factors, such as user attributes, case type and properties, and device layers. For example, for different types of cases, the computing system can execute programmed instructions to characterize force translations between a hand of a user, a particular case type, and a sidewall of device 104.

After obtaining the characterized force translations, the computing system of device 104 can store example case properties in a database that is either local to, or accessible by, device 104. When device 104 determines that a certain case has been applied (e.g., when the case receives the device), the stored case properties can then be used by device 104 to perform case calibration on sensors 502. Hence, by embedding or affixing a tag/indicator (e.g., RFID, barcode, etc.) with a case ID within the case, a user device can read or receive the type of case that has been applied, and calibrate sensors 502 accordingly.

Figure 7:
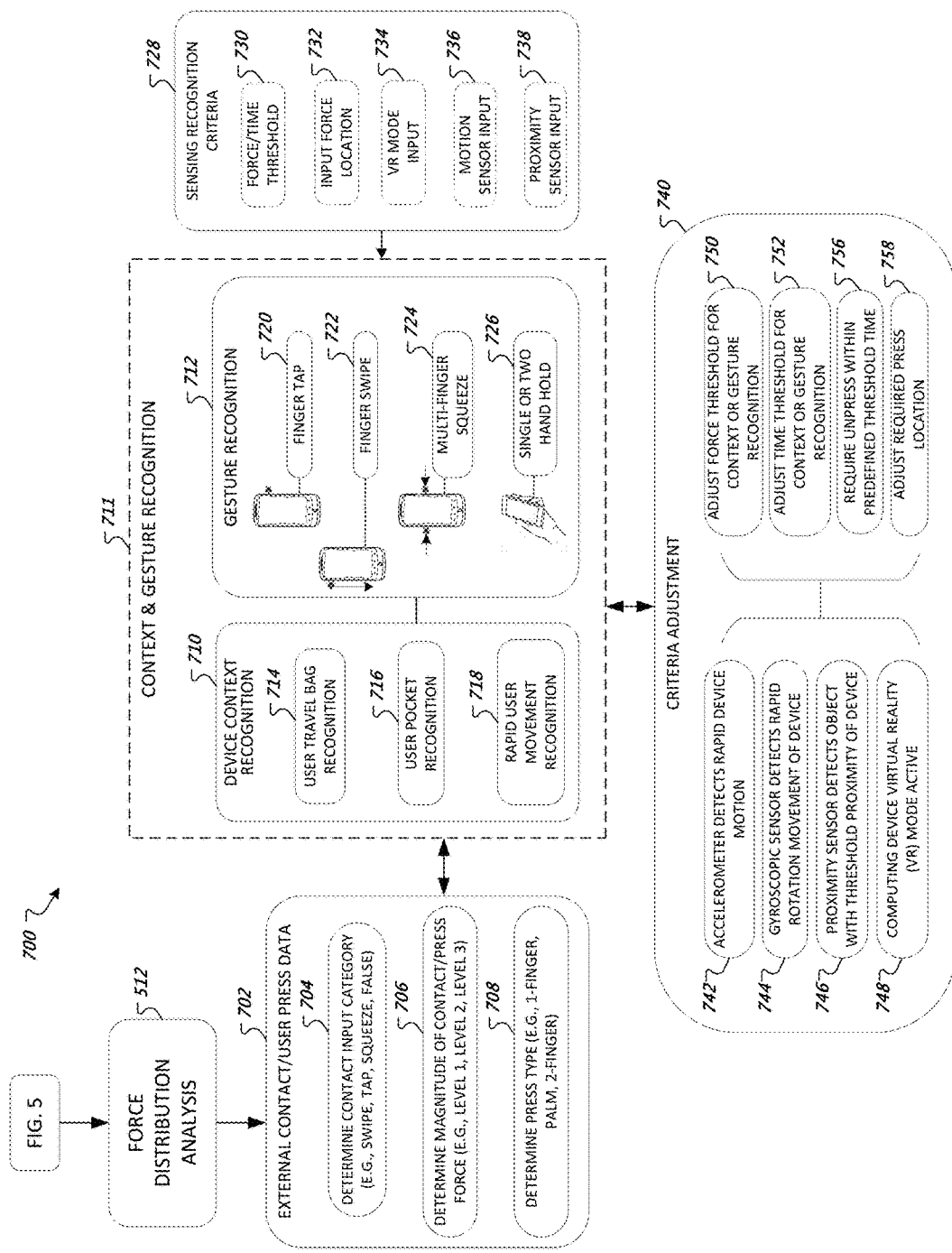
FIG. 7 shows a block diagram depicting a process flow for detecting device context and device gesture recognition received by an electronic device.

FIG. 7 shows a block diagram depicting a process 700 for detecting device context and device gesture recognition received by an electronic device, such as device 104. At least with reference to the implementation of FIG. 7 (and perhaps other embodiments described herein), "device context" can relate at least to a physical location of an example user device, and/or a movement type of an example user device, such as device 104. Further, "device gesture recognition" corresponds at least to a computing system detecting particular types of external contact or input gestures at an edge, or elsewhere, of device 104.

Much like the actions/operations of process 500, described operations of process 700 can be enabled by computing logic or programmed instructions that are executable by a processor and memory of device 104 that collectively form an example computing system.

As shown, process 700 includes box 702 where external contact and/or user press data is analyzed. At box 704, external contact data and press data (e.g., contact force, contact location, and contact duration) are analyzed to determine an input category that defines external contact or user presses at an edge or sidewall of device 104. In some instances, the input category is used to define a particular type of external contact or user press (e.g., swipe contact, tap contact, squeeze contact, false contact).

For example, an input category that defines a particular type of external contact can include at least one of: i) a swipe input category that identifies the external contact as a swipe along edges of the electronic device; ii) a tap input category that identifies the external contact as a tap on edges of the electronic device, or iii) a squeeze input category that identifies the external contact as a squeeze at edges of the electronic device.

As used in this specification, external contact can include intentional contact, or inadvertent contact, to device 104 that is performed by a user of device 104. Hence, external contact necessarily includes user presses, when user presses correspond to an intentional press or contact at an edge of device 104. However, external contact may also include inadvertent contact to device 104 that results from contact not directly performed by a user.

For example, external contact can be defined by the computing system as false contact when the external contact is applied to an edge of device 104 based on movement of the device while positioned inside a travel-bag of a user. False or inadvertent external contact is discussed in more detail below with reference to device context recognition.

At box 706, external contact data that includes at least contact force is analyzed to determine a magnitude of force (e.g., press force) of external contact occurring at an edge or sidewall of device 104. In some implementations, determined force magnitudes can correspond to a particular force level.

For example, some determined force values (e.g., 1-5 Newtons) may correspond to Level-1 force magnitude, other determined force values (e.g., 6-10 Newtons) can correspond to Level-2 force magnitude, and still other determined force values (e.g., 11-15 Newtons) can correspond to Level-3 force magnitude. In some implementations, additional force magnitudes (e.g., Level 4, Level 5, or higher) can be defined and mapped to particular force values based on design requirements of electronic devices that include sensors 502.

At box 708, external contact data and press data (e.g., contact force, contact location, and contact duration) are analyzed to determine a press-type for external contact or user presses at an edge or sidewall of device 104. In some implementations, the computing system can determine a press-type based on analysis of at least one of: force values for an external contact, location data of an external contact, or a time-duration of an external contact.

For example, if sensor 2 (see FIG. 5) generates a signal indicating a level-2 force magnitude while the remaining sensors 1 and 3-6 generate relatively low force values, or at most a high level-1 force magnitude (e.g., 5N of a 1N to 5N range), then the computing system may determine, or detect, at least a 1-finger press-type or a palm press-type. In another example, sensors 3 and 6 may generate respective sensor signals that each indicate a high level-3 force magnitude (e.g., 14N of a 11N to 15N range). For this example, the computing system may determine 2-finger press-type or a 2-finger squeeze press-type.

Box 711 of process 700 includes operations for device context recognition and device gesture recognition. As noted above, device context recognition can relate to a computing system of device 104 detecting a physical location of the device, and/or a particular motion type of the device. Further, device gesture recognition can correspond to detection of particular types of external contact at an edge of device 104.

At box 710, a computing system of device 104 can include program code for detecting or recognizing a particular context of the device. For example, at box 714 and box 716, for certain external contact at an edge of device 104, a computing system can analyze force values, force location, force duration, and other sensor device data (e.g., proximity and/or motion sensor) to detect whether device 104 is located within a travel bag (box 714) of a user or a pocket of a user (box 716).

In some implementations, a proximity sensor of the device (see box 738) can be used to determine or define external contact as false or inadvertent contact. For example, proximity sensor data may indicate that the device is positioned in a user's pocket or travel bag based on the detection, by the proximity sensor, of an interior lining of the user's pocket or the user's travel bag. Hence, the computing system may then determine or define certain received sensor signals as false user input based on the received proximity sensor input data.

At box 718, for certain external contact at an edge of device 104, the computing system can analyze force values, force location, force duration, and other device sensor data to detect whether the device is experiencing rapid movement. For example, frequent or reoccurring low level-1 force magnitude sensor signals can be analyzed to determine that a user of device 104 is running, jogging, or otherwise moving rapidly. In some implementations, in addition to signal data from sensors 502, a computing system may receive input data from device motion sensors, such as data from accelerometers or gyroscopic sensors of the device, to detect rapid user movement.

At box 712, a computing system of device 104 can include program code for detecting or recognizing a particular gesture that corresponds to a type of external contact at an edge of device 104. For example, at box 720 and box 722, for certain external contact to an edge of device 104, the computing system can analyze force values, force location, and force duration to determine that the external contact is a finger tap gesture (box 720) or a finger swipe gesture (box 722).

Likewise, at box 724 and 726, the computing system can analyze force values, force location, and force duration to determine that the external contact is at least a 2-finger/multi-finger squeeze gesture (box 724) or a single or two hand-hold gesture (box 726). In some implementations, determining that the device is being held by a single hand or two hands can be described herein or categorized as a device context rather than as a recognized gesture.

At box 728, a computing system of device 104 can include program code for applying sensing recognition criteria for recognizing device context and/or for recognizing particular types of gestures (e.g., input gestures). In some implementations, the computing system determines device context and particular types of gestures by detecting whether certain sensing recognition criteria has been satisfied.

For example, the computing system can detect whether certain sensing criteria has been satisfied based on an analysis of at least one of: i) determined location(s) of external contact at an edge of device 104, ii) determined force values of the external contact, or iii) determined time duration(s) of the external contact. In some implementations, responsive to detecting that the sensing criteria has been satisfied, the computing system executes an example device user input action based on having received the external contact.

Sensing recognition criteria is identified at box 728. For example, at box 730 sensing recognition criteria can include a threshold force value, such that sensing criteria is satisfied in response to detecting that determined force values of the external contact exceed the threshold force value.

Likewise, at box 730 sensing recognition criteria can include a threshold time duration, such that the sensing criteria is satisfied in response to detecting that the time duration of the external contact: a) exceeds the threshold time duration, or b) is below the threshold time duration.

Further, at box 732 sensing recognition criteria can include a particular location of input force applied to an edge of device 104 based on the external contact, such that the sensing criteria is satisfied in response to detecting that the determined location of the input force (or magnitude of the force) of the external contact corresponds to the particular location.

In some implementations, sensing recognition criteria can also include one or more input signals, received by the computing system, that serve as both sensing criteria that can be satisfied (or not satisfied), or as a basis to adjust thresholds or locations values of the above described force threshold, time threshold, and particular location.

For example, at box 734, sensing recognition criteria can include a virtual reality (VR) mode input signal that indicates whether a VR mode of the device is active or inactive. At box 736, sensing recognition criteria can include a motion sensor input signal that indicates whether the device may be experiencing or under-going rapid movement or motion (e.g., user is running, jogging, on a roller coaster, etc.). At box 738, sensing recognition criteria can include a proximity sensor input signal that indicates whether the device is within a threshold proximity of the user, or another item or object.

Adjustment of sensing recognition criteria is identified at box 740. For example, sensor data associated with one or more of the above described sensor input signals can be used to adjust a threshold force value and/or a threshold time duration of box 730 as well as to adjust a particular input force location of box 732. In some implementations, at least one of the motion sensor input signal, the proximity sensor input signal, or the VR mode input signal can be used to adjust the sensing recognition criteria.

For example, at box 742 a computing system of device 104 can receive a first motion sensor input signal indicating an accelerometer of the device detects rapid or irregular device motion. In response to receiving the first motion sensor input, the computing system can adjust sensing recognition criteria. At box 744, the computing system can receive a second motion sensor input signal indicating a gyroscopic sensor of the device also detects rapid or irregular device motion. In response to receiving the second motion sensor input, the computing system can adjust sensing recognition criteria.

For example, in response to receiving motion sensor data indicating rapid or irregular movement of the device, the computing system can: i) adjust the threshold force value for context or gesture recognition based on received sensor data from the motion sensor that satisfies movement criteria (box 750); and/or ii) adjust the threshold time duration for context or gesture recognition based on the received sensor data from the motion sensor satisfying the movement criteria (box 752).

At box 746, a computing system of device 104 can receive a proximity sensor input signal indicating a proximity sensor of the device detects that an object is within a threshold proximity of the device (e.g., such as when the device is being stored in a handbag or pocket). In response to receiving the proximity sensor input, the computing system can adjust sensing recognition criteria. For example, the computing system can: i) adjust the threshold force value for context or gesture recognition based on received sensor data from the proximity sensor that satisfies proximity criteria; and/or ii) adjust the threshold time duration for context or gesture recognition based on the received sensor data from the proximity sensor that satisfies the proximity criteria.

At box 748, the computing system of the device can receive a VR mode input signal indicating a VR mode of the device is active, has been activated, or is inactive. In response to receiving the VR mode input signal, the computing system can adjust sensing recognition criteria. For example, the computing system can: i) adjust the threshold force value for context or gesture recognition based on received VR mode input data that satisfies certain criteria (e.g., indicating VR mode is active or inactive); and/or ii) adjust the threshold time duration for context or gesture recognition based on the received VR mode input data that satisfies certain criteria.

Additionally, in response to receiving at least one of: certain proximity sensor input data, certain motion sensor input data, or certain VR mode input data, the computing system can adjust sensing recognition criteria. For example, at box 756, for certain external contact or press types, the computing system can adjust the criteria for context or gesture recognition by requiring an un-press within a pre-defined threshold time (e.g., within one second). Likewise, at box 758, the computing system can adjust the criteria for context or gesture recognition by defining a new required press/contact location, or by modifying, shifting, or otherwise changing an existing required press location.

Figure 8:
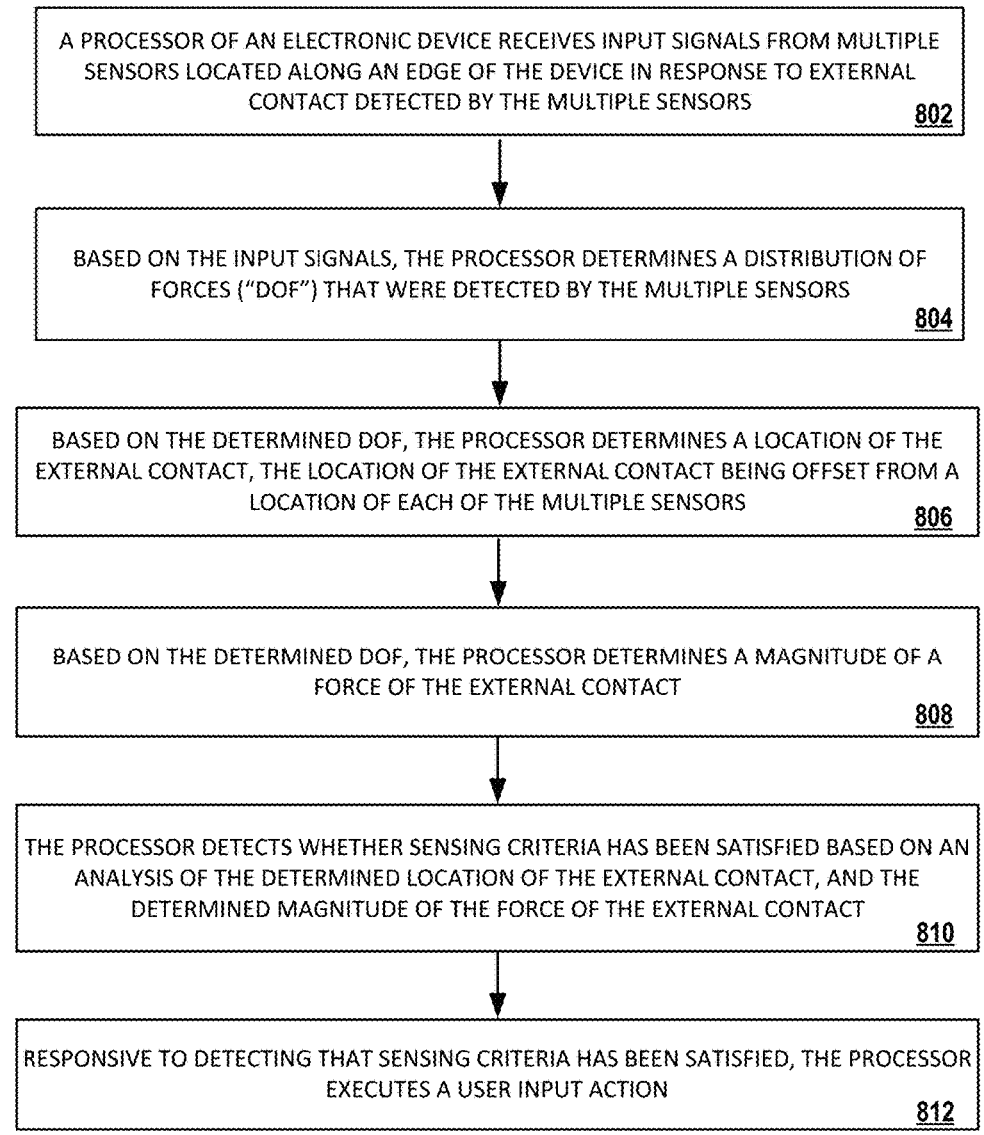
FIG. 8 shows a process flow chart for using received sensor signals to execute a device response based on external contact force applied to the device.

FIG. 8 shows a process 800 for using received sensor signals to execute a device response based on external contact force applied to the device. In some implementations, process 800 may be performed or executed by an example computing system of device 104 as well as sensors 502 described above.

Process 800 begins at block 802 where, in response to external contact to an edge of an example electronic device (e.g., device 104), a computing system of the device receives input signals from multiple sensors 502 that may be located at an edge of the device. At block 804, the computing system uses the received input signals to determine a distribution of forces applied to sensors 502.

In some implementations, determining the distribution of forces applied to the multiple sensors can include generating an example force distribution profile. Sensor output signals (e.g., input signals to the computing system) associated with the force distribution profile can be analyzed and/or extracted from a dataset of the profile. In some instances, parameter values (e.g., voltage, current, or charge) of the input signals can correspond to measured force applied to an edge of device 104 for a given time duration.

At block 806, based on an analysis of the distribution of forces, the computing system determines a location of the external contact. In some instances, the determined location may specify a location that is at least offset from each of multiple sensors 502. For example, determined locations can correspond to: i) a location that aligns with a central axis of a particular sensor, ii) a location that is offset (e.g., slightly offset) from a central axis of a particular sensor, or iii) a location that is generally intermediate at least two sensors, or generally intermediate at least two adjacent sensors.

At block 808, based on the analysis of the distribution of forces, the computing system determines a force value that indicates a certain input force (or magnitude of the force) of the external contact applied to, or at, the edge of the device. The determined force value(s) may also correspond to a particular type of external contact. For example, determined force values may correspond to types of external contact such as swipe contact at an edge of the device, tap contact at an edge of the device, or squeeze contact at an edge of the device.

At block 810, the computing system detects whether certain sensing criteria has been satisfied based on an analysis of the determined location, the determined force value, and a time duration of the external contact. In some implementations, the sensing criteria can include a threshold force value, and the criteria may be satisfied when a determined force value exceeds the threshold force value.

The sensing criteria can further include a threshold time duration, and the criteria may be satisfied when a time duration of the external contact either: a) exceeds the threshold time duration, or b) is below the threshold time duration. In other implementations, the sensing criteria can further include a particular location of the external contact, and the criteria may be satisfied when the determined location of the external contact matches, or corresponds to, the particular location.

At block 812, in response to detecting that sensing criteria has been satisfied, the computing system executes an electronic device user input action. For example, the computing system can launch a particular application program file that is stored in a memory of the device or in a memory location that is accessible by the device.

Figure 9:
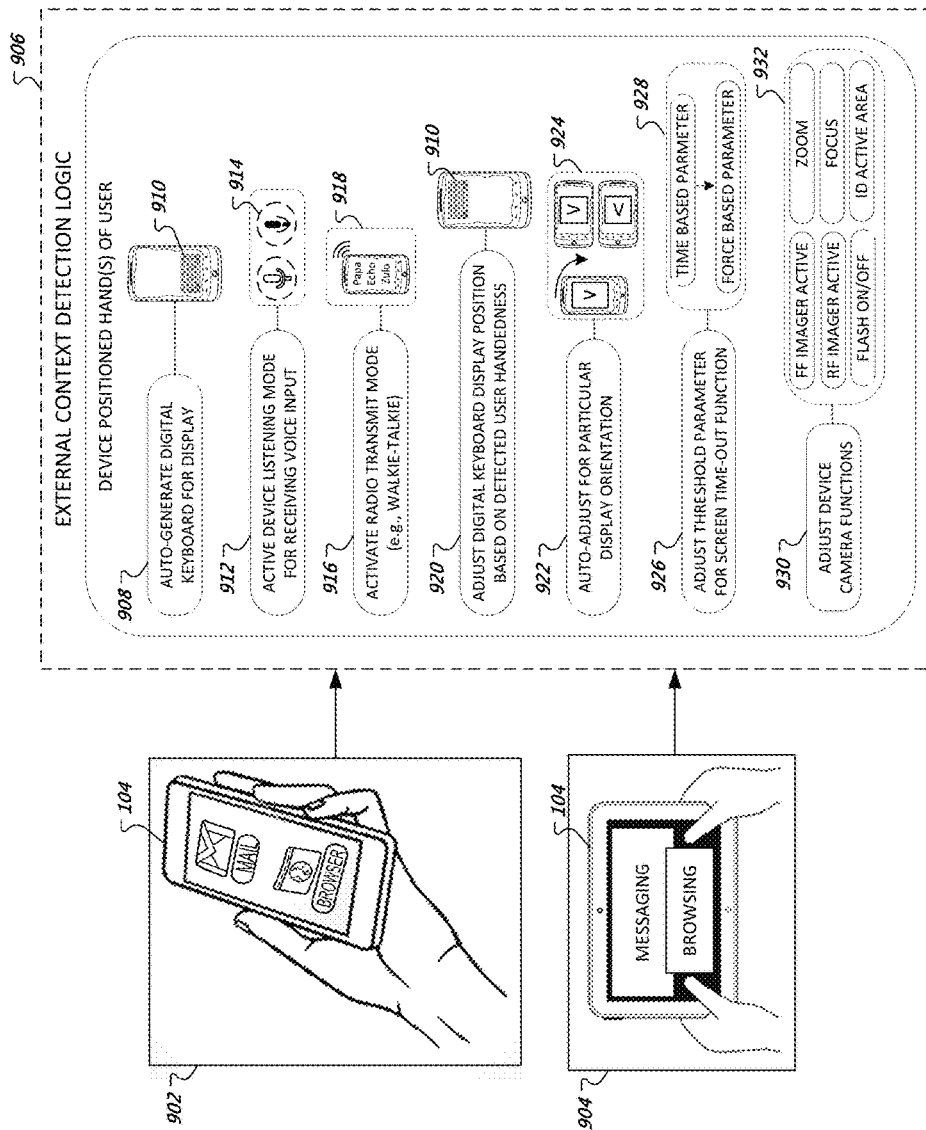
FIG. 9 shows a block diagram of multiple device responses that a device may activate as a result of that device detecting various external contexts.

FIG. 9 shows a block diagram of multiple device responses that can occur based on external context detection by an electronic device, such as device 104. At least with reference to the implementation of FIG. 9 (and perhaps other embodiments described herein), an "external context" of an electronic device can include at least a position or location of the device relative to a user, and/or an orientation of the device relative to the user.

For example, external context can correspond to, or indicate, a vertical orientation of the device relative to a viewing plane of the user or a horizontal orientation of the device relative to a viewing plane of the user. In some implementations, external context can correspond to, or indicate, one or more particular types of: i) input gestures, ii) device contexts, iii) device positions/locations, or iv) device orientations.

Much like the actions/operations of process 500 and process 700, described device operations or device responses depicted in the block diagram of FIG. 9 (including FIG. 10-FIG. 12) can be enabled by computing logic or programmed instructions that are executable by a processor and memory of device 104 and that collectively form an example computing system of device 104.

In the implementation of FIG. 9, and with reference to an external context of an electronic/computing device, at box 902, device 104 is shown as having an external context that includes the device being positioned in at least one hand (e.g., the left hand) of the user and in a vertical/upright, or generally vertical, orientation relative to the user. Alternatively, at box 904, device 104 is shown as having an external context that includes the device being positioned in both hands of the user and in a horizontal, or generally horizontal, orientation relative to the user.

In some implementations, device 104 can have an external context that includes the device being slanted, tilted, or angled relative to the user, or relative to a viewing plane of the user. For example, device 104 can have a slanted, tilted, or angled orientation relative to the user when the user moves or rotates the device from a vertical or upright (e.g., generally vertical) orientation to a horizontal orientation.

In some implementations, a computing system of device 104 receives input signals from a first sensor of sensors 502 in response to user contact at a first edge of the device. The computing system also receives second input signals from a second sensor of sensors 502 in response to user contact at a second edge of the device. As discussed above, the first and second sensors are disposed adjacent an inner surface of device 104 and may be covered by a housing of device 104 that does not include mechanically actuated buttons located over each of sensors 502. In some instances, the first and second edges correspond to an exterior surface of device 104 and are proximate the first and second sensors, respectively.

Responsive to the computing system receiving the first and second input signals, device 104 can detect (e.g., determine) an external context of device 104. In some implementations, the detected external context is based on at least one of: i) the first input signals, ii) the second input signals, or iii) input signals generated by two or more sensors of sensors 502. The detected external context can indicate a position of device 104 relative to a user, or an orientation of the device relative to the user.

To detect an external context of device 104, the computing system can utilize sensor readings (e.g., generated input signals) from sensors disposed at one or more sidewalls of device 104. In some implementations, the computing system receives input signals generated by the sensors and uses machine learning algorithms to train a neural network or other type of machine learning system to detect or recognize reoccurring force values, force locations, and force time durations (collectively "force data") that are associated with certain sensors.

Further, the machine learning system can be trained to detect or recognize reoccurring distribution of forces or force distribution profiles (included in the descriptor "force data") for certain groups of sensors. Some force data can be associated with particular types of: i) input gestures, ii) device contexts, iii) device positions, or iv) device orientations (collectively "external contexts").

In response to training the machine learning system, the computing system can use the machine learning system to generate a computing model based on machine learning principles and that encodes a variety of learned detections associated with received force data. In some implementations, the computing model represents programmed software instructions that are included within, and/or accessible by, a computing system of device 104. Thus, a computing system of device 104 can be used to detect or recognize particular types of input contexts based on learned and/or programmed associations between the force data and the input contexts.

When used by device 104, the computing model can be configured to detect or recognize certain input contexts based on analysis of force data for signals generated by sensors 502 in response to external contact at an edge of device 104. For example, device 104 can include a pocket recognition mode whereby the device uses the computing model to detect or recognize, based on received force data, that device 104 has been placed or positioned in a pocket of the user.

Further, device 104 can include a hand recognition mode whereby the device uses the computing model to detect, based on received force data, that device 104 is positioned, e.g., being held, in at least one hand of the user. In some implementations, a computing system of device 104 can be configured, e.g., using the computing model, to detect an external context (or input context) of the device that indicates device 104 is being held in a particular hand of the user. For example, device 104 can use or analyze received force data to detect whether a user is holding the device in the user's left hand, in the user's right hand, or in both the left hand and the right hand of the user.

In some implementations, a computing system of device 104 can be configured to detect a variety of external/input contexts through analysis of force data received in response to external contact at an edge of device 104. Responsive to detecting the external context, the computing system can cause device 104 to execute a particular user input action. In some implementations, the user input action is performed by device 104 based on the detected external context. A variety of user input actions are described in more detail.

Referring again to the implementation of FIG. 9, box 906 depicts device functions relating to user input actions perform by device 104 based on a detected external context. In general, the user input actions can be performed by device 104 in response to a computing system of the device executing program code at least to execute a particular application file stored in a memory of the device.

At box 908, a detected external context indicates that device 104 has transitioned to being positioned in at least one hand of the user (e.g., from not being positioned in at least one hand of the user). A user input action that is performed based on an external context detected at box 908 includes the computing system causing a display of device 104 to transition from not displaying a virtual keyboard to displaying a virtual keyboard 910.

In some implementations, a detected external context can indicate that device 104 has transitioned to being positioned in a particular hand of the user, to the exclusion of being positioned in both hands of the user or another hand of the user. For example, a detected external context can indicate that device 104 has transitioned to being positioned in the user's left hand, e.g., as shown at box 902.

In some implementations, the computing system can cause device 104 to perform one or more particular user input actions in response to receiving force data used to detect an external context indicating device 104 is positioned in a particular hand of the user. For example, virtual keyboard 910 may be generated for presentation to the user on a display of device 104 and the particular user input action can include adjusting a displayed position of virtual keyboard 910. Adjusting a displayed position of virtual keyboard 910 can include locating the keyboard at a displayed position that corresponds to a position of the particular hand of the user that is holding device 104 (see box 920).

For example, if a detected external context indicates device 104 has transitioned to being held in the user's right hand, a displayed position of virtual keyboard 910 can be adjusted such that the user can more easily access keys of virtual keyboard 910 using their right hand. Likewise, if a detected external context indicates device 104 has transitioned to being held in the user's left hand (see e.g., box 902), a displayed position of virtual keyboard 910 can adjusted such that the user can more easily access keys of virtual keyboard 910 using their left hand. In some implementations, adjusting a displayed position of virtual keyboard 910 can provide a keyboard display position that is more ergonomically beneficial to the user.

At box 912, a detected external context indicates that device 104 has transitioned to being positioned in at least one hand of the user and force data analyzed by the computing system causes a particular device mode to be activated. A user input action performed based on an external context detected at box 908 includes activating a listening mode of device 104 for receiving voice-input after device 104 has transitioned to being positioned in at least one hand of the user. In some implementations, a display of device 104 can illuminate a microphone icon 914 to provide indication to the user that the listening mode has been activated.

In addition to activating the listening mode, the performed user input action can also include device 104 supplying an audible reply to the voice input provided by the user. In other implementations, a user input action performed based on the external context detected at box 912 can include activating a voice-input to text conversion mode of device 104. For example, upon activation of the voice-input to text-conversion mode, voice-input received by device 104, and after the device transitioned to being positioned in at least one hand of the user, is converted to text for presentation to the user on a display of device 104.

At box 916, a detected external context indicates that device 104 has transitioned to being positioned in at least one hand of the user and force data analyzed by the computing system causes a particular device mode to be activated. A user input action performed based on an external context detected at box 916 includes at least one of: a) activating or deactivating an audio signal transmission mode of device 104 (e.g., a radio transmit mode), or b) causing a modulated radio signal including audio data to be transmitted by device 104 and for receipt by a second electronic device that is within a threshold distance of device 104. A display of device 104 can show an example radio transmit icon 918 to provide indication to the user that an audio signal transmission mode of the device has been activated.

At box 920, detecting an external context of device 104 can include detecting a handedness of the user. For example, a computing system of device 104 can analyze force data for sensor signals to detect an external context indicating the device has transitioned to being positioned in a particular hand of the user.

In some implementations, the computing system can analyze force data associated with force applied to a first edge of device 104 by external contact from a palm of a particular hand of the user that contacts the first edge.

Additionally, the analyzed force data can be associated with force applied to a second edge of device 104 by external contact from fingers of the particular hand of the user that contacts the second edge.

Over time, reoccurring analysis of force data associated with the palm or fingers of a particular hand of the user can indicate that the user is right handed or left handed (e.g., left or right user handedness). Accordingly, a detected external context can indicate: i) that device 104 has transitioned to being positioned in the user's right hand, and ii) that analyzed force data indicates the user has a demonstrated propensity of right handedness.

In some implementations, a user input action performed based on this detected external context can include adjusting a displayed position of virtual keyboard 910 by locating the keyboard at a position that corresponds to the handedness of the user. For example, if a detected external context indicates that the user is right handed (or left handed), a displayed position of virtual keyboard 910 can be adjusted such that the user can more easily access keys of virtual keyboard 910 using their right hand (or their left hand).

At box 922, a detected external context indicates that device 104 has transitioned to being positioned in at least one hand of the user and has been oriented to have either a vertical/upright orientation relative to the user or a horizontal orientation relative to the user. A user input action performed based on this detected external context can include a computing system of device 104 adjusting (e.g., automatically adjusting) an orientation of content presented to the user on a display of the electronic device.

As shown at box 924, in some implementations, a detected external context can indicate that device 104 has transitioned from a vertical/upright orientation relative to the user, in which content presented to the user was displayed using a portrait orientation that aligns with dimensions of the display, to a horizontal orientation relative to the user, in which content presented to the user can be displayed either using the portrait orientation or using a landscape orientation that aligns with dimensions of the display.

In some implementations, a detected external context can indicate that device 104 has transitioned from a vertical/upright orientation relative to the user, to a horizontal orientation relative to the user. The detected external context can also indicate that user contact at first and second edges of device 104 is occurring or occurred at the same time. The detected external context can further indicate that a user input gesture includes at least one of: i) a swipe input along a particular edge of device 104; ii) a tap input on a particular edge of device 104; or iii) a squeeze input at a particular edge of device 104.

Referring again to position/orientation, device 104 can be positioned and/or oriented in one of multiple orientations or positions relative to the user. Thus, device 104 can be configured to continuously detect external contexts indicating a new or modified device position or orientation relative to the user. A user input action performed based on these detected external contexts can include a computing system of device 104 detecting the same input gesture regardless of an orientation (or position) of the device relative to the user.

For example, device 104 can be configured to: a) detect a swipe input along a particular edge(s) of the device irrespective of a particular orientation or position of the device relative to the user; b) detect a tap input on a particular edge(s) of the device irrespective of a particular orientation or position of the device relative to the user, or c) detect a squeeze input at a particular edge(s) of the device irrespective of a particular orientation or position of the device relative to the user.

At box 926, a detected external context indicates that device 104 has transitioned to being positioned in at least one hand of the user and force data analyzed by the computing system data indicates that constant, or relatively constant, external contact has been applied at an edge of device 104 in excess of a threshold time. A user input action performed based on an external context detected at box 926 includes the computing system adjusting a threshold parameter associated with a screen or display time-out function of device 104.

In some implementations, adjusting the threshold parameter can include initiating the screen time-out function by using a force-based parameter instead of a time-based parameter (box 928). For example, the detected external context may be based on the analyzed force data indicating that the user is holding device 104 and viewing media content (e.g., streaming content) that is viewable on a display of the device.

Rather than device 104 initiating a display time-out feature using a time parameter (e.g., by measuring elapsed time since a last received user input), device 104 can instead initiate the display time-out feature using a force-based parameter. For example, the force-based parameter can be used to extend or inhibit display time-out when the computing system receives force values indicating a certain threshold force is being applied from user contact at an edge of device 104. As such, the screen of the device 104 may not turn off, or may delay longer to turn off, when device 104 is being held by the user.

Additionally, the force-based parameter can be used to turn on a device display when the computing system receives force values indicating a certain threshold force is being applied from user contact at an edge(s) of device 104. As such, the screen of the device 104 may turn on when device 104 transitions from not being positioned in at least one hand of the user to be being positioned or held in at least one hand of the user.

At box 930, a detected external context indicates that device 104 has transitioned to being positioned in at least one hand of the user and force data analyzed by the computing system causes a particular application to be activated. A user input action performed based on an external context detected at box 930 includes activating a camera application of the device 104. In some implementations, the user input action performed at box 930 can include causing the camera application to use the device camera to capture digital image content.

In other implementations, the user input action can include causing the camera application to perform a variety of other camera related functions indicated at box 932. For example, the user input action can include causing the camera application to at least one of: i) activate front-facing imager camera functions; ii) activate rear-facing imager camera functions; iii) turn on, or turn off, a camera flash function; iv) initiate an image zoom camera function; v) activate an image focusing feature of the camera; vi) identify an active imaging area of a displayed object; or vii) capture digital image content.

Figure 10:
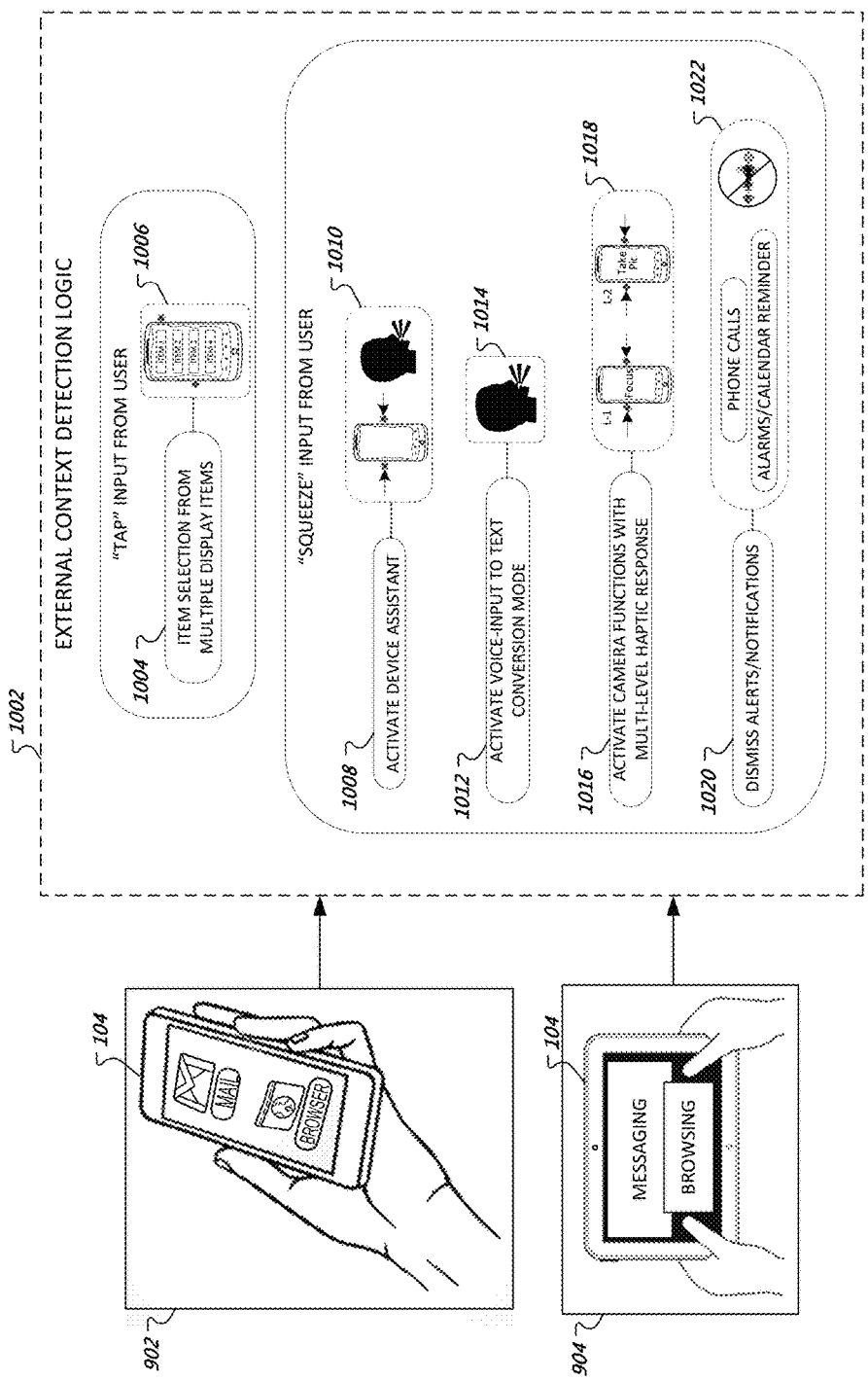
FIG. 10 shows a block diagram of multiple device responses that a device may activate as a result of that device detecting particular categories of user inputs.

FIG. 10 shows a block diagram of multiple device responses that can occur for particular categories of user inputs determined to have been received by an electronic device. As discussed above, an external context can correspond to, or indicate, one or more particular types of: i) input gestures/categories, ii) device contexts, iii) device positions/locations, or iv) device orientations.

Further, certain force data can indicate a particular type of user press or input gesture (e.g., a swipe, a tap, or a squeeze). In some instances, input categories define a particular type of user contact or user press (e.g., swipe contact, tap contact, or squeeze contact). Box 1002, depicts device functions relating to user input actions performed by device 104 based on a detected external context that indicates a particular input gesture or user contact at an edge of the device.

Referring to FIG. 10, at box 1004, one or more items can be selected in response to user contact that is identified as tap input at an edge of device 104. For example, as shown at box 1006, a display of device 104 may display multiple items and a tap input gesture, indicated generally by a dot at an edge of the device, can be used by the user to select one or more items presented for display to the user.

At box 1008, a device assistant or personal assistant application of device 104 can be activated in response to user contact that is identified as a particular squeeze input at an edge of device 104. In some instances, device 104 can be configured such that a user of device 104 can select, from among multiple different types of input gestures (e.g., squeeze, tap, swipe, etc.), a particular type of input gesture that the user desires to apply at an edge of device 104 to activate or initiate a certain device function. In other instances, the user can define, and dynamically adjust, particular types of input gestures as desired by the user.

For example, as indicated generally at box 1010, device 104 can be configured such that, when being held in at least one hand of the user, a 2-finger squeeze input gesture, indicated generally by dots and respective arrows pointing toward edges of the device and adjacent the dots, can be used by the user to activate the assistant application. Activation of the assistant application can cause device 104 to play recorded audio data as a prompt to which the user can reply with voice-input (box 1010).

At box 1012, a voice-input to text conversion application of device 104 can be activated in response to squeeze input at an edge of device 104. In some implementations, a particular squeeze input gesture can be used by the user to activate the voice-to-text application.

For example, device 104 can be configured such that, when being held in at least one hand of the user, a 1-finger squeeze by the user can activate the voice-to-text application for receiving voice-input from the user (box 1014). In some implementations, the 1-finger squeeze applies constant force of a certain magnitude and duration (e.g., level-2 and for two seconds) to a first edge of the device.

In response to detecting a 1-finger squeeze having a level-2 force magnitude and that meets, or exceeds, a particular time threshold, device 104 can activate the voice-to-text application for receiving voice-input from the user (box 1014). During the 1-finger squeeze, the user's palm may be detected as applying force of a lesser magnitude (e.g., level-1) to a second edge of device 104. In some implementations, the force data indicating force applied by the user's palm at the second edge can be also used to activate the voice-to-text application.

At box 1016, one or more camera functions associated with a camera application of device 104 can be activated in response to squeeze input at an edge of device 104. In some implementations, a particular squeeze input gesture can be used by the user to activate certain camera functions. For example, a 2-finger squeeze by the user that simultaneously applies force to opposing edges of device 104 can be used to activate certain camera functions (or other device functions).

In some implementations, during a 2-finger squeeze, different fingers of the same hand of the user can each apply constant force to two opposing edges of device 104 to activate a particular device function (e.g., camera function). The force applied to each of the two opposing edges of device 104 can be of a certain magnitude and duration (e.g., level-1 and for one second).

For example, at box 1018, device 104 can be configured such that, when being held in at least one hand of the user, a 2-finger squeeze activates an image focusing feature of a device camera in response to the squeeze applying level-1 force to opposing edges of the device for a one second duration. In some implementations, device 104 can be configured to provide a haptic response or indication to the user based on the user: i) meeting (or exceeding) a force threshold for activating the focusing feature; and/or ii) meeting (or exceeding) a time duration threshold for activating the focusing feature.

Likewise, at box 1018, device 104 can be further configured such that, when being held in at least one hand of the user, a 2-finger squeeze activates an image capture function of the device camera in response to the squeeze applying level-2 force to opposing edges of the device for a two second duration. In some implementations, device 104 can be configured to provide a haptic response or indication to the user simultaneous with the camera capturing image content and/or activating a shutter function of the camera.

In some instances, when a camera application of the device causes image capture to occur using a timing-delay, device 104 can be configured to provide a haptic response or indication to the user based on the user: i) meeting (or exceeding) a force threshold for activating delayed imaged capture; and/or ii) meeting (or exceeding) a time duration threshold for activating delayed imaged capture.

In alternative implementations, device 104 can be configured to provide haptic responses to a user when a user meets, or exceeds, predefined force and time thresholds for activating certain camera functions, or other device applications or device modes. In some instances, in addition to meeting the force and time thresholds, an input gesture (e.g., squeeze input) may need to be applied at a particular location along an edge of device 104 to activate a certain device application or device mode.

At box 1020, an alert/notification can be snoozed (e.g., reoccur based on a time parameter) or dismissed and/or a vibrate mode or a silent mode of device 104 can be activated in response to squeeze input at an edge of device 104. In some implementations, a particular squeeze input gesture can be used by the user to snooze, dismiss, silence, or otherwise cancel an alert generated by device 104, or to enter a particular device mode.

For example, as generally indicated at box 1022, a 2-finger squeeze by the user that simultaneously applies force to opposing edges of device 104 can be used to at least one of: i) snooze/dismiss/silence/cancel an alert or notification of device 104; ii) activate a vibrate mode of device 104; or iii) activate a silent mode of device 104 in which one or more alerts, phone calls, alarms, messages, emails, or calendar reminders of the device do not cause an auditory or haptic response from the device.

In some implementations, during a 2-finger squeeze, different fingers of the same hand of the user can each apply constant force to a single edge of device 104 to dismiss one or more alerts and/or to activate a particular device mode.

The force applied by each finger to the single edge of device 104 can be of a certain magnitude and duration (e.g., level-1 and for one second). Much like the 2-finger squeeze input gesture described above with reference to box 1016, distinct force and time thresholds, and distinct force locations, can be used by a computing system of device 104 to dismiss one or more alerts and/or to activate a particular device mode.

Figure 11:
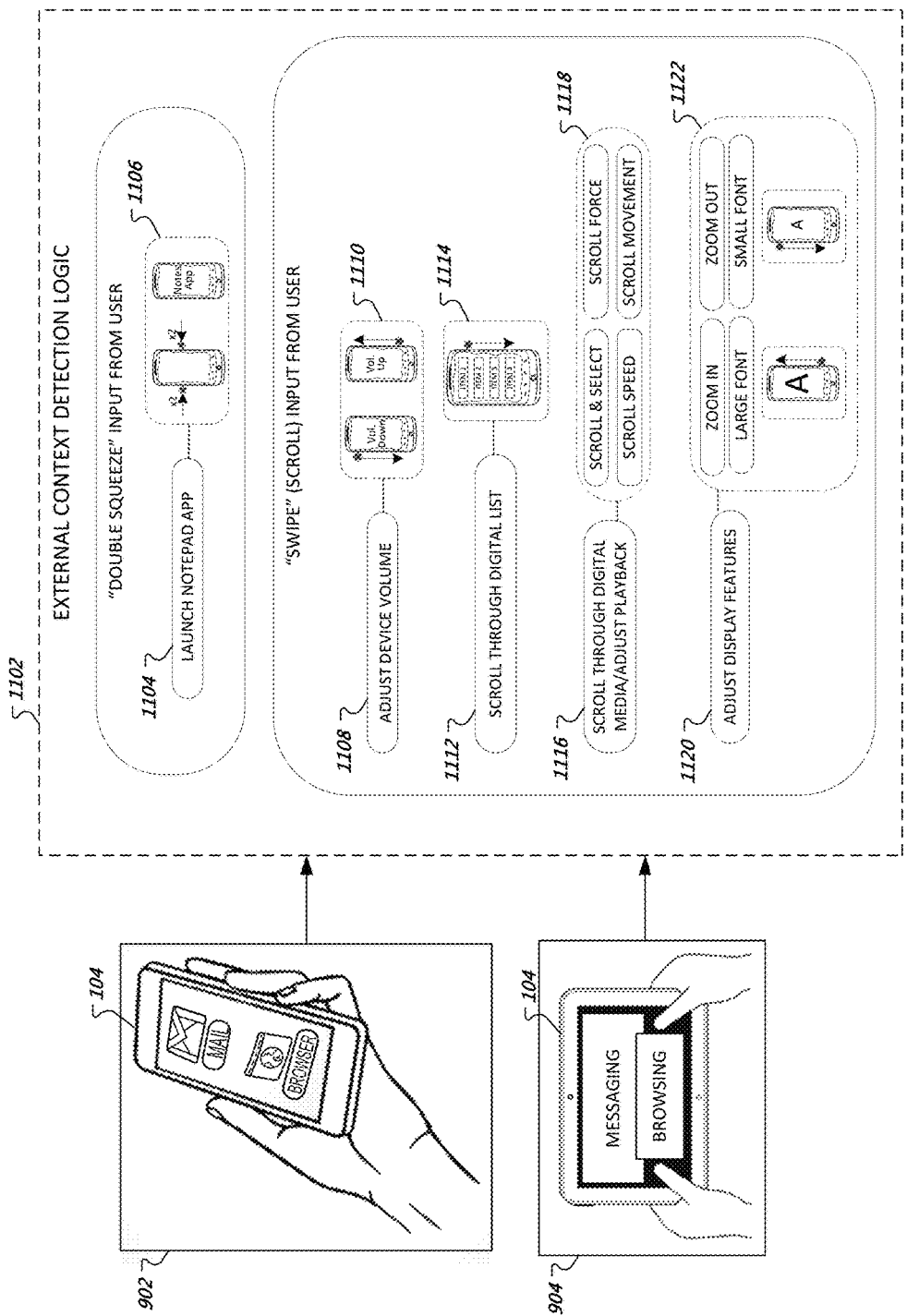
FIG. 11 shows another block diagram of multiple device responses that a device may activate as a result of that device detecting particular categories of user inputs.

FIG. 11 shows another block diagram of multiple device responses that can occur for particular categories of user inputs received by an electronic device. Similar to box 1002, box 1102 also depicts device functions relating to user input actions performed by device 104 based on a detected external context that indicates a particular input gesture or user contact at an edge of the device.

At box 1104, a note-taking application of device 104 can be activated in response to user contact that is identified as a particular squeeze input at an edge of device 104. For example, as indicated generally at box 1106, device 104 can be configured such that, when being held in at least one hand of the user, a 2-finger double squeeze input gesture (2×) can be used by the user to activate the note-taking application (e.g., one two-fingered squeeze, followed by a release, and another two-fingered squeeze). The 2-finger double squeeze input gesture is indicated generally by dots and respective arrows pointing toward edges of the device and adjacent the dots.

At box 1108, a volume control of device 104 can be adjusted in response to user contact that is identified as swipe input along an edge of the device. For example, as shown at box 1110, a swipe input gesture along an edge of device 104 in a first direction (e.g., downwardly) can cause a volume control of the device to be decreased. Likewise, a swipe input gesture along an edge of device 104 in a second direction (e.g., upwardly) can cause a volume control of the device to be increased. A swipe input gesture is indicated generally by a dot and directional arrow at an edge of the device.

At box 1112, one or more items can be scrolled in response to user contact that is identified as swipe input along an edge of device 104. For example, as shown at box 1114, a display of device 104 may display multiple items and a swipe input gesture can be used by the user to scroll through a listing including the multiples items presented for display to the user. The swipe input gesture is indicated generally by a dot and directional arrow at an edge of the device.

In some implementations, to detect or recognize a scroll (e.g., swipe input) along a side or edge of device 104, a computing system of the device can monitor and analyze how an example force wave travels across adjacent sensors. In some instances, the force wave corresponds to sensor signal data for force curves of an example force distribution profile. Additionally, the computing system can analyze the force waves for indications of slight or subtle force applied from user contact (e.g., relatively soft contact) at opposing edges of device 104.

These indicators of slight force can be used to detect user contact that is likely a precursor to an impending swipe input gesture, e.g., to initiate scrolling a displayed content list. In some implementations, the slight force indicators can occur when a user initiates or adjusts their grip of device 104 so as to begin providing swipe input along an edge of the device (e.g., to begin scrolling displayed items).

In some implementations, the speed at which displayed items are scrolled may be generally proportional to a force applied for a swipe input and/or a speed with which a user swipes along an edge of device 104. Hence, a user can adjust an example scroll velocity by increasing or decreasing the speed of their swipe input gesture and/or increasing or decreasing the force applied to an edge of device 104 from their swipe input gesture. For example, a swipe of the same speed but with greater force to the edge of device 104 can cause device 104 to scroll faster than if the force were determined by device 104 to be less.

At box 1116, media playback can be adjusted and displayed media items can be scrolled in response to user contact that is identified as swipe input along an edge of device 104. For example, media items or other electronic content may be viewable to a user on a display of device 104. As indicated at box 1118, the media items can be scrolled or selected based on swipe and tap gesture inputs at an edge of device 104. Further, at least one media item can be a recorded audio file or video file that can played back to the user via device 104 upon selection of the file by the user.

In some implementations, during playback of a selected media item, user contact associated with one or more input gestures can be used to adjust a playback attribute of the media file. For example, a user can increase or decrease the speed of a frame rate of video playback, as well as video capture, based on varying the speed and varying the magnitude of the force of a swipe input gesture at an edge of device 104.

In other implementations, a user can activate and adjust a slow-motion feature of video playback, or video capture, based on varying the force applied and relative length of a swipe input gesture at an edge of device 104. The relative length of the swipe can be defined from a start point (initial and constant contact) of the swipe input along the edge of device 104 to an end point (end of contact) of the swipe input along the edge of device 104.

In some instances, device 104 can be configured to quickly navigate an audio or video file. For example, during media playback, device 104 can initiate a scrubbing feature of an example media application, to at least quickly navigate an audio file by varying the speed, force applied, and relative length of a swipe input gesture at an edge of device 104. For example, swiping with less force can cause device 104 to navigate the audio at a slower speed than if the force were greater.

At box 1120, one or more display features of device 104 can be adjusted in response to user contact that is identified as swipe input along an edge of the device. As shown at box 1122, a display of device 104 may display a particular item and a swipe input gesture at an edge of device 104 can be used to initiate a zoom function of a device display.

For example, a swipe input gesture along an edge of device 104 in a first direction (e.g., upwardly) can cause displayed content to be enlarged or magnified (e.g., increase apparent font size) while presented to the user. Likewise, a swipe input gesture along an edge of device 104 in a second direction (e.g., downwardly) can cause an apparent size of displayed content to be reduced (e.g., decrease apparent font size) while presented to the user. At box 1122, a swipe input gesture is indicated generally by a dot and directional arrow at an edge of the device.

In some implementations, device 104 can include a car-mount recognition mode whereby the computing system uses force data received in response to external contact at device 104 to detect that the device is positioned inside a motor vehicle and in a mounting device configured to hold electronic devices while a user operates the vehicle. In other implementations, within a gaming application used via device 104, sensors 502 can enable input control functions for manipulating gaming controls, such as steering mechanisms, triggering mechanisms, and/or zooming in and out of a particular gaming environment.

Figure 12:
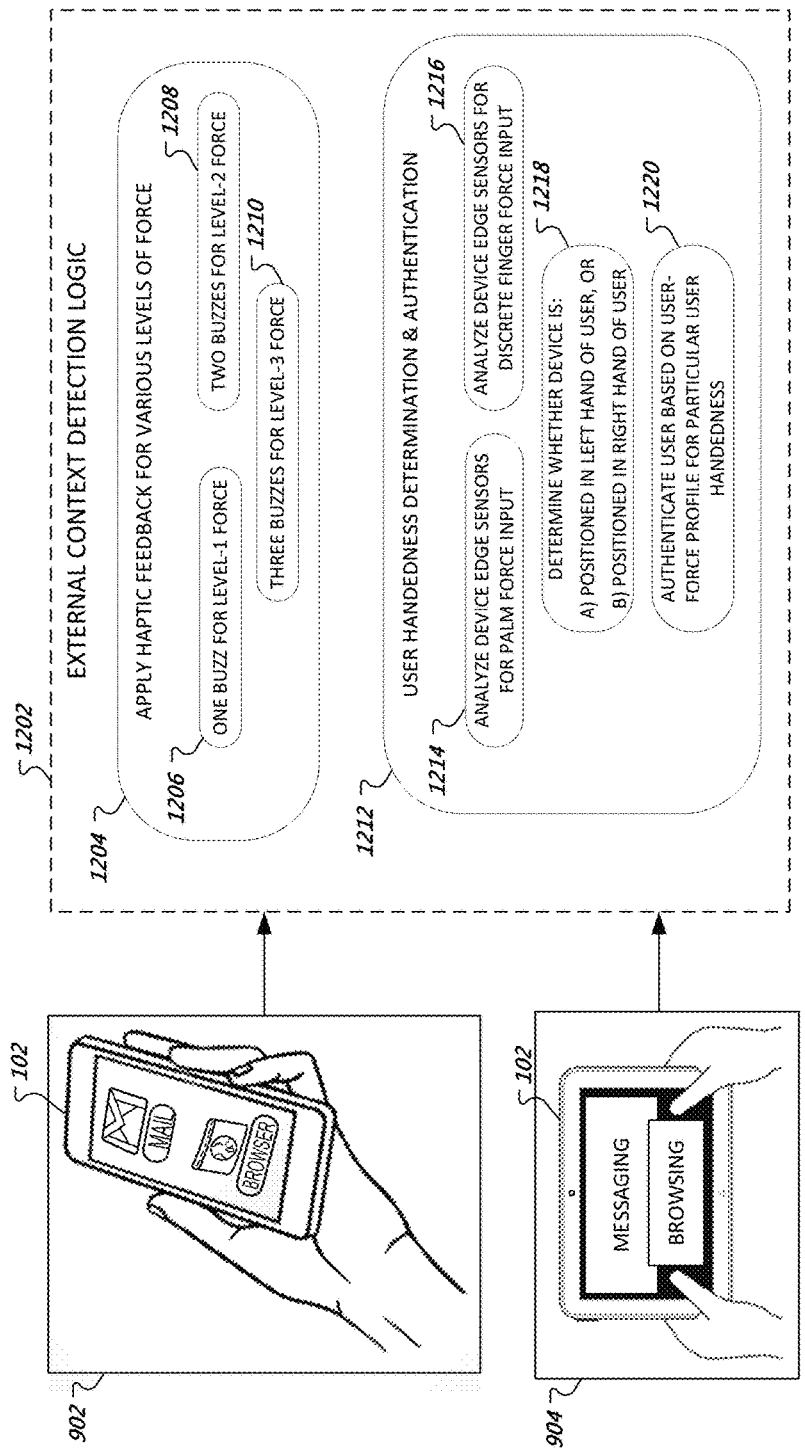
FIG. 12 shows a block diagram of multiple device sensor functions relative to force and gesture recognition features of an electronic device.

FIG. 12 shows a block diagram of multiple device sensor functions relative to force and gesture recognition features of an electronic device. Similar to boxes 1002 and 1102, box 1202 also depicts device functions relating to user input actions performed by device 104 based on a detected external context that indicates a particular input gesture or user contact at an edge of the device.

Box 1204 indicates that device 104 can be configured to provide or generate one or more distinct haptic responses or feedback to a user based on a detected external context. The haptic responses can be generated in response to a computing system of device 104 detecting that a threshold level of force is being applied to an edge of the device based on user contact at the device edge. The user contact can correspond to a detected external context (e.g., an input gesture).

For example, device 104 can be configured to generate distinct haptic responses or indications that can include at least one of: i) at box 1206, a single haptic response (vibrate/buzz for one second) based on device 104 detecting that user contact is applying level-1 force; ii) at box 1208, two haptic responses (1-second vibrate/buzz (2×)) based on device 104 detecting that user contact is applying level-2 force; iii) at box 1210, three haptic responses (1-second vibrate/buzz (3×)) based on device 104 detecting that user contact is applying level-3 force.

In some implementations, a computing system of device 104 can be configured to generate a visual indicator for presentation to the user on a display of the device 104. The visual indicator can provide a graphical representation depicting an example force curve, or force scale, that can be referenced by the user to obtain the force magnitude (e.g., level and Newtons) of the particular force being applied from user contact at an edge of device 104.

As discussed above, box 1212 further indicates that device 104 can be configured to determine or detect user handedness based on a detected external context and/or authenticate a user based on a detected external context and one or more features of the device.

At box 1214, force data is generated based on user contact that includes force input/contact from a left palm of the user and from a right palm of the user. At box 1216, force data is generated based on user contact that includes discrete force input/contact from fingers of the left hand of the user and from fingers of the right hand of the user.

At box 1218, the analyzed force data generated from user contact at the edge of device 104 from the users left and right hand, is used by the computing system of device 104 to determine whether the device: a) has transitioned to being positioned in the left hand of the user, or b) has transitioned to being positioned in the right hand of the user.

As discussed above, analysis of force data associated with the palm or fingers of a particular hand of the user can indicate that the user is right handed or left handed (e.g., left or right user handedness). Accordingly, a detected external context can indicate that device 104 has transitioned to being positioned in the user's right hand and analyzed force data indicates the user has a demonstrated propensity of using the device with their right hand. Hence, a computing system of device 104 may determine that the user is right-handed.

In some implementations, a computing system of device 104 can be configured to generate a user-force profile for the left and right hands of a user of the device. The user-force profile can be generated based on reoccurring force values that result from user contact at an edge of device 104 and that are associated with the user's left and right hands.

In some instances, the user-force profile can include force values that are unique (e.g., substantially unique) to a particular user and based on the handedness of the user. For example, a left hand user-force profile for a left-handed user can include detailed palm and finger force data based on the user's propensity to use the device substantially with their left hand. Hence, at box 1220, device 104 can be configured to authenticate the particular user based on a generated user-force profile that includes force data for a particular user handedness.

In some implementations, device 104 can include a fingerprint sensor that can capture and analyze data for multiple ridges associated with a fingerprint of left hand fingers and/or right hand fingers of the user. The analyzed fingerprint data can be used to determine a size (e.g., an approximate size) of the hands of a user. In some implementations, in response to determining a size of the hand of the user, device 104 uses the determined hand size to normalize/adjust or calibrate sensor signals generated by sensors 502.

Figure 13:
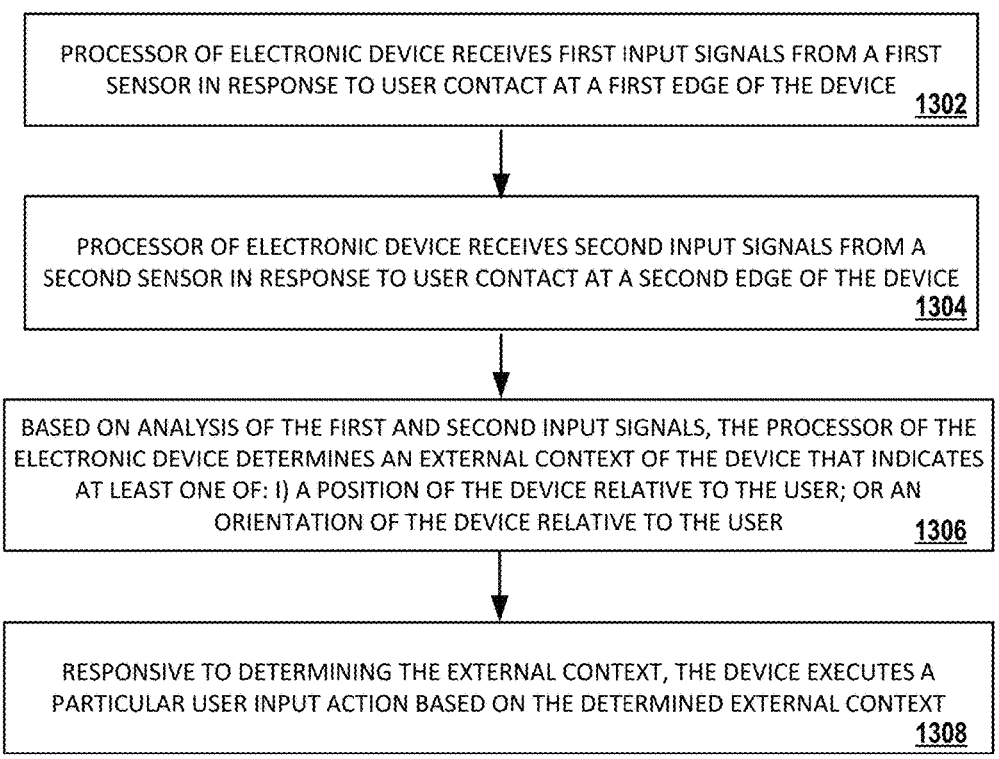
FIG. 13 shows a process flow chart for using sensor signals that are received by an electronic device to execute a device response based on an external context that is detected by the electronic device.

FIG. 13 shows a process 1300 for using received sensor signals to execute a device response based on a detected external context of an electronic device. In some implementations, process 1300 may be performed or executed by an example computing system of device 104 as well as sensors 502 described above.

Process 1300 begins at block 1302 where an example electronic device (e.g., device 104) receives first input signals from a first sensor in response to user contact at a first edge of the device. At block 1304 device 104 receives second input signals from a second sensor in response to user contact at a second edge of the device. The first and second sensors are disposed adjacent an inner surface of the device. In some implementations, the first edge is proximate the first sensor and the second edge is proximate the second sensor.

At block 1306, responsive to device 104 receiving the first input signals and receiving the second input signals, the device detects an external context of the device. In some implementations, detection of the external context can be based on a computing system of device 104 analyzing force data indicated by the first and second input signals. The detected external context indicates at least a position of the device relative to a user or an orientation of the device relative to the user.

At block 1308, responsive to detecting the external context, device 104 executes a particular user input action for the device to perform based on the detected external context. In some implementations, the user input action can include activating a particular device mode, such as a device listening mode or a radio transmit mode. In other implementations, the user input action can include the device using/executing a particular application, such as executing a camera application and using the camera application to capture digital image content.

To provide for interaction with a user, the systems and techniques described here can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of embodiments have been described. Nevertheless, it will be understood that various modifications may be made without departing from the spirit and scope of the disclosed technology. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
receiving, by one or more processors of an electronic device, input signals from multiple sensors located along an edge of the electronic device, the input signals being generated in response to external contact detected by the multiple sensors;
determining, by the one or more processors and based on the input signals, a distribution of forces that were detected by the multiple sensors;
determining, by the one or more processors and based on the determined distribution of forces, a location of the external contact, wherein the location of the external contact is:
  i) intermediate at least two adjacent sensors of the multiple sensors, and
  ii) offset from a location of each of the at least two adjacent sensors;
determining, by the one or more processors and based on the determined distribution of forces, a magnitude of a force of the external contact, wherein the electronic device includes a first substrate layer and a second substrate layer that are each disposed between an exterior surface of the electronic device and the multiple sensors, and determining the magnitude of the force of the external contact comprises:
  i) normalizing parameter values of the received input signals based on a first deflection property of the first substrate layer, and a second deflection property of the second substrate layer that is different than the first deflection property, and
  ii) determining, based on the normalized parameter values, the magnitude of the force of the external contact;
detecting, by the one or more processors, whether sensing criteria have been satisfied based on an analysis of:
  i) the determined location of the external contact, and
  ii) the determined magnitude of the force of the external contact; and
executing, by the one or more processors, responsive to detecting that the sensing criteria have been satisfied, a user input action.

2. The method of claim 1, wherein determining the distribution forces includes generating a distribution profile by:
  i) executing Gaussian distribution logic to generate a data structure comprising parameter values for input signals generated by the multiple sensors in response to the external contact, and
  ii) determining, based on at least a subset of the parameter values, the location of the external contact.

3. The method of claim 1, wherein:
  i) the location of the external contact is a central location of the external contact;
  ii) the central location of the external contact is intermediate the at least two adjacent sensors of the multiple sensors; and
  iii) the central location of the external contact is offset from the location of each of the at least two adjacent sensors.

4. A computer-implemented method, comprising:
receiving, by one or more processors of an electronic device, input signals from multiple sensors located along an edge of the electronic device, the input signals being generated in response to external contact detected by the multiple sensors;
determining, by the one or more processors and based on the input signals, a distribution of forces that were detected by the multiple sensors;
determining, by the one or more processors and based on the determined distribution of forces, a location of the external contact, wherein the location of the external contact is:
  i) intermediate at least two adjacent sensors of the multiple sensors, and
  ii) offset from a location of each of the at least two adjacent sensors;
determining, by the one or more processors and based on the determined distribution of forces, a magnitude of a force of the external contact, wherein determining the magnitude of the force of the external contact comprises:
  i) identifying, based on a signal received from a sensor of the electronic device, a property of a protective housing in which the electronic device is encased,
  ii) normalizing parameter values of the received input signals based on the property of the protective housing, and
  iii) determining, based on the normalized parameter values, the magnitude of the force of the external contact;

detecting, by the one or more processors, whether sensing criteria have been satisfied based on an analysis of:
  i) the determined location of the external contact, and
  ii) the determined magnitude of the force of the external contact, and
executing, by the one or more processors, responsive to detecting that the sensing criteria have been satisfied, a user input action.

5. The method of claim 4, wherein identifying the property of the protective housing comprises:
  i) detecting that the electronic device has been received by the protective housing,
  ii) in response to detecting that the electronic device has been received by the protective housing, identifying machine-readable data that is affixed to the protective housing, and
  iii) identifying, based on the machine-readable data, the property of the protective housing.

6. An electronic system comprising:
one or more processors; and
one or more non-transitory machine-readable storage devices storing instructions that are executable by the one or more processors to cause performance of operations that comprise:
  receiving, by one or more processors of an electronic device, input signals from multiple sensors located along an edge of the electronic device, the input signals being generated in response to external contact detected by the multiple sensors;
  determining, by the one or more processors and based on the input signals, a distribution of forces that were detected by the multiple sensors;
  determining, by the one or more processors and based on the determined distribution of forces, a location of the external contact, wherein the location of the external contact is:
    i) intermediate at least two adjacent sensors of the multiple sensors, and
    ii) offset from a location of each of the at least two adjacent sensors;
  determining, by the one or more processors and based on the determined distribution of forces, a magnitude of a force of the external contact, wherein the electronic device includes a first substrate layer and a second substrate layer that are each disposed between an exterior surface of the electronic device and the multiple sensors, and determining the magnitude of the force of the external contact comprises:
    i) normalizing parameter values of the received input signals based on a first deflection property of the first substrate layer, and a second deflection property of the second substrate layer that is different than the first deflection property, and
    ii) determining, based on the normalized parameter values, the magnitude of the force of the external contact;
  detecting, by the one or more processors, whether sensing criteria have been satisfied based on an analysis of:
    i) the determined location of the external contact, and
    ii) the determined magnitude of the force of the external contact; and
  executing, by the one or more processors, responsive to detecting that the sensing criteria have been satisfied, a user input action.

7. The electronic system of claim 6, wherein determining the distribution forces includes generating a distribution profile by:
  i) executing Gaussian distribution logic to generate a data structure comprising parameter values for input signals generated by the multiple sensors in response to the external contact, and
  ii) determining, based on at least a subset of the parameter values, the location of the external contact.

8. An electronic system comprising:
one or more processors; and
one or more non-transitory machine-readable storage devices storing instructions that are executable by the one or more processors to cause performance of operations that comprise:
  receiving, by one or more processors of an electronic device, input signals from multiple sensors located along an edge of the electronic device, the input signals being generated in response to external contact detected by the multiple sensors;
  determining, by the one or more processors and based on the input signals, a distribution of forces that were detected by the multiple sensors;
  determining, by the one or more processors and based on the determined distribution of forces, a location of the external contact, wherein the location of the external contact is:
    i) intermediate at least two adjacent sensors of the multiple sensors, and
    ii) offset from a location of each of the at least two adjacent sensors;
  determining, by the one or more processors and based on the determined distribution of forces, a magnitude of a force of the external contact, wherein determining the magnitude of the force of the external contact comprises:
    i) identifying, based on a signal received from a sensor of the electronic device, a property of a protective housing in which the electronic device is encased,
    ii) normalizing parameter values of the received input signals based on the property of the protective housing, and
    iii) determining, based on the normalized parameter values, the magnitude of the force of the external contact;
  detecting, by the one or more processors, whether sensing criteria have been satisfied based on an analysis of:
    i) the determined location of the external contact, and
    ii) the determined magnitude of the force of the external contact; and
  executing, by the one or more processors, responsive to detecting that the sensing criteria have been satisfied, a user input action.

9. The electronic system of claim 8, wherein identifying the property of the protective housing comprises:
  i) detecting that the electronic device has been received by the protective housing,
  ii) in response to detecting that the electronic device has been received by the protective housing, identifying machine-readable data that is affixed to the protective housing, and
  iii) identifying, based on the machine-readable data, the property of the protective housing.

10. A computer-implemented method, comprising:
receiving, by one or more processors of an electronic device, input signals from multiple sensors located along an edge of the electronic device, the input signals being generated in response to external contact detected by the multiple sensors;
determining, by the one or more processors and based on the input signals, a distribution of forces that were detected by the multiple sensors, wherein determining the distribution forces comprises generating a distribution profile by executing Gaussian distribution logic to generate a data structure comprising parameter values for input signals generated by the multiple sensors in response to the external contact;
determining, by the one or more processors and based on the determined distribution of forces, a location of the external contact, wherein the location of the external contact is:
  i) offset from a location of each of the multiple sensors; and
  ii) determined using at least a subset of the parameter values included in the data structure;
determining, by the one or more processors and based on the determined distribution of forces, a magnitude of a force of the external contact;
detecting, by the one or more processors, whether sensing criteria have been satisfied based on an analysis of:
  i) the determined location of the external contact, and
  ii) the determined magnitude of the force of the external contact; and
executing, by the one or more processors, responsive to detecting that the sensing criteria have been satisfied, a user input action.

11. The method of claim 10, further comprising determining that the external contact comprises one of:
  i) a swipe along the edge of the electronic device,
  ii) a tap on the edge of the electronic device, or
  iii) a squeeze at two edges of the electronic device.

12. The method of claim 10, further comprising determining that the external contact comprises an inadvertent user input.

13. The method of claim 10, wherein the sensing criteria comprises at least one of:
  i) a threshold magnitude of force, such that the sensing criteria is satisfied in response to detecting that the determined magnitude of the force of the external contact exceeds the threshold magnitude of force;
  ii) a threshold time duration, such that the sensing criteria is satisfied in response to detecting that a time duration of the external contact exceeds the threshold time duration, or is below the threshold time duration; or
  iii) a particular location of the external contact, such that the sensing criteria is satisfied in response to detecting that the determined location of the external contact corresponds to the particular location.

14. The method of claim 13, wherein the electronic device includes a proximity sensor and a motion sensor, and the method further comprises at least one of:
  i) adjusting the threshold magnitude of the force based on data being received from the proximity sensor or the motion sensor satisfying proximity or movement criteria; or
  ii) adjusting the threshold time duration based on data being received from the proximity sensor or the motion sensor satisfying the proximity or the movement criteria.

15. An electronic system comprising:
one or more processors; and
one or more non-transitory machine-readable storage devices storing instructions that are executable by the one or more processors to cause performance of operations comprising:
  receiving, by one or more processors of an electronic device, input signals from multiple sensors located along an edge of the electronic device, the input signals being generated in response to external contact detected by the multiple sensors;
  determining, by the one or more processors and based on the input signals, a distribution of forces that were applied to the multiple sensors, wherein determining the distribution forces comprises generating a distribution profile by executing Gaussian distribution logic to generate a data structure comprising parameter values for input signals generated by the multiple sensors in response to the external contact;
  determining, by the one or more processors and based on the determined distribution of forces, a location of the external contact, wherein the location of the external contact is:
    i) offset from a location of each of the multiple sensors; and
    ii) determined using at least a subset of the parameter values included in the data structure;
  determining, by the one or more processors and based on the determined distribution of forces, a magnitude of a force of the external contact;
  detecting, by the one or more processors, whether sensing criteria have been satisfied based on an analysis of:
    i) the determined location of the external contact,
    ii) the determined magnitude of the force of the external contact, and
    iii) a time duration of the external contact; and
  executing, by the one or more processors, responsive to detecting that the sensing criteria have been satisfied, a user input action.

16. The electronic system of claim 15, further comprising that the external contact comprises one of:
  i) a swipe along the edge of the electronic device,
  ii) a tap on the edge of the electronic device, or
  iii) a squeeze at two edges of the electronic device.

17. The electronic system of claim 15, further comprising that the external contact comprises an inadvertent user input.

18. The electronic system of claim 15, wherein the sensing criteria comprises at least one of:
  i) a threshold magnitude of force, such that the sensing criteria is satisfied in response to detecting that the determined magnitude of the force of the external contact exceeds the threshold magnitude of force;
  ii) a threshold time duration, such that the sensing criteria is satisfied in response to detecting that the time duration of the external contact exceeds the threshold time duration, or is below the threshold time duration; or
  iii) a particular location of the external contact, such that the sensing criteria is satisfied in response to detecting that the determined location of the external contact corresponds to the particular location.

19. The electronic system of claim 18, wherein the electronic device includes a proximity sensor and a motion sensor, and the method further comprises at least one of:

i) adjusting the threshold magnitude of force based on data being received from the proximity sensor or the motion sensor satisfying proximity or movement criteria; or
ii) adjusting the threshold time duration based on data being received from the proximity sensor or the motion sensor satisfying the proximity or the movement criteria.

* * * * *

UNITED STATES PATENT AND TRADEMARK OFFICE
CERTIFICATE OF CORRECTION

PATENT NO. : 10,514,797 B2  
APPLICATION NO. : 15/490760  
DATED : December 24, 2019  
INVENTOR(S) : Kugler et al.

Page 1 of 1

It is certified that error appears in the above-identified patent and that said Letters Patent is hereby corrected as shown below:

On the Title Page

The first or sole Notice should read --

Subject to any disclaimer, the term of this patent is extended or adjusted under 35 U.S.C. 154(b) by 64 days.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*